(12) United States Patent
Wu

(10) Patent No.: US 10,440,611 B2
(45) Date of Patent: Oct. 8, 2019

(54) RLC DATA PACKET OFFLOADING METHOD AND BASE STATION

(71) Applicant: Huawei Technologies Co., Ltd., Shenzhen (CN)

(72) Inventor: Huanyu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/671,718

(22) Filed: Aug. 8, 2017

(65) Prior Publication Data

US 2017/0339599 A1 Nov. 23, 2017

Related U.S. Application Data

(63) Continuation of application No. PCT/CN2015/093233, filed on Oct. 29, 2015.

(30) Foreign Application Priority Data

Feb. 9, 2015 (WO) ................ PCT/CN2015/072572
Aug. 25, 2015 (WO) ................ PCT/CN2015/088049

(51) Int. Cl.
*H04W 28/08* (2009.01)
*H04L 1/18* (2006.01)
(Continued)

(52) U.S. Cl.
CPC .......... *H04W 28/08* (2013.01); *H04L 1/1812* (2013.01); *H04L 1/1825* (2013.01);
(Continued)

(58) Field of Classification Search
CPC ... H04W 16/32; H04W 28/065; H04W 28/08; H04W 80/02; H04W 84/045;
(Continued)

(56) References Cited

U.S. PATENT DOCUMENTS 6,081,517 A * 6/2000 Liu .................. H04M 11/062
370/352
7,522,919 B2 * 4/2009 Yoon .................. H04W 24/00
455/428

(Continued)

FOREIGN PATENT DOCUMENTS

CN 101754351 A 6/2010
CN 101795494 A 8/2010
(Continued)

OTHER PUBLICATIONS

"Flow control for split bearer option," 3GPP TSG-RAN WG3 Meeting #83bis, San Jose del Cabo, Mexico, R3-140819, 3rd Generation Partnership Project, Valbonne, France (Mar. 31-Apr. 4, 2014).

(Continued)

*Primary Examiner* — Eric Nowlin
(74) *Attorney, Agent, or Firm* — Leydig, Voit & Mayer, Ltd.

(57) ABSTRACT

The present invention relates to the field of communications technologies, and in particular, to an RLC data packet offloading method and a base station, so as to solve a problem that performance of UE in a CA scenario of a non-ideal backhaul HetNet is affected due to a relatively long transmission delay between a macro eNodeB and a micro eNodeB. In embodiments of the present invention, a micro eNodeB may request a required RLC data packet before scheduling is performed; therefore, a macro eNodeB can send, to the micro eNodeB in advance, the RLC data packet required by the micro eNodeB, which reduces a transmission delay between the macro eNodeB and the micro eNodeB as much as possible, and improves receiving performance of UE.

19 Claims, 5 Drawing Sheets

(51) Int. Cl.
*H04W 84/04* (2009.01)
*H04W 16/32* (2009.01)

(52) U.S. Cl.
CPC .......... *H04L 1/1893* (2013.01); *H04L 1/1822* (2013.01); *H04W 16/32* (2013.01); *H04W 84/045* (2013.01)

(58) Field of Classification Search
CPC ... H04L 1/1812; H04L 1/1822; H04L 1/1825; H04L 1/1841; H04L 1/1848; H04L 1/1867; H04L 1/1874; H04L 1/188; H04L 1/1887; H04L 1/189; H04L 1/1893; H04L 1/1896
See application file for complete search history.

(56) References Cited

U.S. PATENT DOCUMENTS

| | | | | |
|---|---|---|---|---|
| 7,948,932 B2 * | 5/2011 | Murata | H04L 1/0003 | 370/252 |
| 8,416,800 B2 * | 4/2013 | Sun | H04L 5/0044 | 370/328 |
| 8,477,719 B2 * | 7/2013 | Ho | H04W 36/02 | 370/331 |
| 8,509,180 B2 * | 8/2013 | Maheshwari | H04W 76/10 | 370/331 |
| 8,630,259 B2 * | 1/2014 | Tenny | H04W 36/02 | 370/331 |
| 8,638,773 B2 * | 1/2014 | Ho | H04L 1/1825 | 370/349 |
| 8,989,004 B2 * | 3/2015 | Zhang | H04L 1/08 | 370/231 |
| 9,247,452 B2 * | 1/2016 | Xu | H04L 1/18 | |
| 9,386,458 B1 * | 7/2016 | Hui | H04W 16/04 | |
| 9,504,030 B2 * | 11/2016 | Lee | H04L 1/1832 | |
| 9,526,056 B2 * | 12/2016 | Tomici | H04W 36/04 | |
| 9,648,514 B2 * | 5/2017 | Blankenship | H04L 69/322 | |
| 9,763,263 B2 * | 9/2017 | Lv | H04W 72/12 | |
| 9,838,282 B2 * | 12/2017 | Dudda | H04L 43/062 | |
| 10,015,805 B2 * | 7/2018 | Zhang | H04W 76/18 | |
| 10,027,593 B2 * | 7/2018 | Zhang | H04L 47/34 | |
| 10,116,578 B2 * | 10/2018 | Meylan | H04L 47/624 | |
| 10,129,804 B2 * | 11/2018 | Fukuta | H04W 52/0206 | |
| 10,212,728 B2 * | 2/2019 | Lee | H04W 80/02 | |
| 2005/0013283 A1 * | 1/2005 | Yoon | H04W 24/00 | 370/350 |
| 2006/0120403 A1 * | 6/2006 | Murata | H04L 1/0003 | 370/468 |
| 2008/0130684 A1 * | 6/2008 | Jiang | H04L 1/1841 | 370/476 |
| 2009/0086677 A1 * | 4/2009 | Ho | H04W 36/02 | 370/331 |
| 2009/0168723 A1 * | 7/2009 | Meylan | H04L 1/1841 | 370/331 |
| 2009/0238155 A1 * | 9/2009 | Sun | H04L 5/0044 | 370/336 |
| 2009/0286541 A1 * | 11/2009 | Maheshwari | H04W 76/10 | 455/436 |
| 2009/0319850 A1 * | 12/2009 | Baek | H04L 1/1874 | 714/748 |
| 2010/0029280 A1 * | 2/2010 | Tenny | H04W 36/02 | 455/436 |
| 2010/0034169 A1 * | 2/2010 | Maheshwari | H04L 1/1874 | 370/331 |
| 2010/0215006 A1 * | 8/2010 | Ho | H04L 1/1825 | 370/329 |
| 2012/0008561 A1 * | 1/2012 | Wang | H04W 36/02 | 370/328 |
| 2012/0155438 A1 * | 6/2012 | Shin | H04W 28/065 | 370/336 |
| 2012/0281564 A1 * | 11/2012 | Zhang | H04L 1/08 | 370/252 |
| 2013/0201841 A1 | 8/2013 | Zhang et al. | | |
| 2013/0201945 A1 * | 8/2013 | Sun | H04L 5/0044 | 370/329 |
| 2013/0336294 A1 * | 12/2013 | Dinan | H04W 72/04 | 370/336 |
| 2014/0010207 A1 | 1/2014 | Horn et al. | | |
| 2014/0204771 A1 * | 7/2014 | Gao | H04W 36/28 | 370/252 |
| 2014/0328182 A1 | 11/2014 | Gao et al. | | |
| 2014/0362767 A1 * | 12/2014 | Xu | H04L 1/18 | 370/328 |
| 2015/0043435 A1 * | 2/2015 | Blankenship | H04L 69/322 | 370/329 |
| 2015/0043505 A1 * | 2/2015 | Kim | H04L 1/1861 | 370/329 |
| 2015/0045032 A1 * | 2/2015 | Tomici | H04W 36/04 | 455/436 |
| 2015/0049653 A1 * | 2/2015 | Baghel | H04L 1/1861 | 370/280 |
| 2015/0133128 A1 * | 5/2015 | Xiong | H04W 36/22 | 455/444 |
| 2015/0237621 A1 * | 8/2015 | Zhu | H04L 1/1685 | 370/329 |
| 2015/0326456 A1 * | 11/2015 | Dudda | H04L 43/062 | 370/252 |
| 2016/0021581 A1 * | 1/2016 | Deenoo | H04W 36/0069 | 370/331 |
| 2016/0050605 A1 * | 2/2016 | Kim | H04W 28/08 | 370/331 |
| 2016/0050611 A1 * | 2/2016 | Wang | H04W 28/08 | 370/328 |
| 2016/0095135 A1 * | 3/2016 | Lv | H04W 72/12 | 370/336 |
| 2016/0219458 A1 * | 7/2016 | Kubota | H04W 28/06 | |
| 2016/0234847 A1 * | 8/2016 | Zhang | H04W 76/18 | |
| 2016/0315868 A1 * | 10/2016 | Zhang | H04L 47/34 | |
| 2016/0345204 A1 * | 11/2016 | Godin | H04W 40/34 | |
| 2016/0374036 A1 * | 12/2016 | Wang | H04W 76/00 | |
| 2017/0048765 A1 * | 2/2017 | Meylan | H04L 1/1841 | |
| 2017/0055169 A1 * | 2/2017 | Ogura | H04W 72/04 | |
| 2017/0055176 A1 * | 2/2017 | Xiao | H04L 5/0055 | |
| 2017/0085492 A1 * | 3/2017 | Xiao | H04L 1/1874 | |
| 2017/0099617 A1 * | 4/2017 | Tomici | H04W 36/04 | |
| 2017/0118133 A1 * | 4/2017 | Meylan | H04L 47/624 | |
| 2017/0181185 A1 * | 6/2017 | Lee | H04W 72/1289 | |
| 2017/0215125 A1 * | 7/2017 | Wu | H04W 36/00 | |
| 2017/0244520 A1 * | 8/2017 | Koskinen | H04L 1/1848 | |
| 2017/0245252 A1 * | 8/2017 | Gao | H04L 69/322 | |
| 2017/0264562 A1 * | 9/2017 | Yi | H04W 80/02 | |
| 2017/0303170 A1 * | 10/2017 | Uchino | H04W 16/32 | |
| 2017/0339599 A1 * | 11/2017 | Wu | H04W 28/08 | |
| 2017/0367017 A9 * | 12/2017 | Meylan | H04L 1/1841 | |
| 2018/0092146 A1 * | 3/2018 | Hong | H04W 76/15 | |
| 2018/0123920 A1 * | 5/2018 | Dudda | H04L 43/062 | |
| 2018/0205808 A1 * | 7/2018 | Yang | H04L 69/324 | |
| 2018/0317236 A1 * | 11/2018 | Yang | H04W 72/10 | |
| 2018/0317237 A1 * | 11/2018 | Zhang | H04W 76/18 | |
| 2019/0007324 A1 * | 1/2019 | Sebire | H04W 28/02 | |

FOREIGN PATENT DOCUMENTS

| | | | | |
|---|---|---|---|---|
| CN | 102868504 A * | 1/2013 | ........... | H04L 1/1685 |
| CN | 102958102 A | 3/2013 | | |
| CN | 103733557 A | 4/2014 | | |
| CN | 103840927 A | 6/2014 | | |
| CN | 103929783 A | 7/2014 | | |
| CN | 104080121 A | 10/2014 | | |
| CN | 104168655 A | 11/2014 | | |
| CN | 104202778 A | 12/2014 | | |
| CN | 104812000 A | 7/2015 | | |
| EP | 2833665 A1 | 2/2015 | | |
| EP | 2890035 A1 * | 7/2015 | ........... | H04L 1/1685 |
| EP | 2894903 A1 * | 7/2015 | ........... | H04W 40/34 |
| EP | 2890035 A4 * | 8/2015 | ........... | H04L 1/1685 |
| EP | 3089509 A1 * | 11/2016 | ........... | H04W 76/00 |
| EP | 3089509 A4 * | 1/2017 | ........... | H04W 76/00 |
| EP | 3247148 A4 * | 1/2018 | ........... | H04W 28/08 |
| GB | 2560065 A * | 8/2018 | ............. | H04W 8/08 |

(56) References Cited

FOREIGN PATENT DOCUMENTS

| | | | | |
|---|---|---|---|---|
| JP | 2014158159 A | 8/2014 | | |
| JP | 2014525701 A | 9/2014 | | |
| JP | 2016527812 A | 9/2016 | | |
| KR | 20150007593 A | 1/2015 | | |
| WO | WO-2013142361 A1 * | 9/2013 | ............ | H04W 36/04 |
| WO | 2013169048 A2 | 11/2013 | | |
| WO | WO-2013178112 A1 * | 12/2013 | ........... | H04L 1/1685 |
| WO | 2014153937 A1 | 10/2014 | | |
| WO | 2015011184 A1 | 1/2015 | | |
| WO | WO-2015104345 A1 * | 7/2015 | ............ | H04W 40/34 |
| WO | WO-2017192138 A2 * | 11/2017 | ............ | H04L 29/06 |
| WO | WO-2017192138 A3 * | 2/2018 | | |

OTHER PUBLICATIONS

"PDCP reordering in dual connectivity," 3GPP TSG-RAN WG2 #85bis, Valencia, Spain, R2-141544, 3rd Generation Partnership Project, Valbonne, France (Mar. 31-Apr. 4, 2014).

"User plane interruption handling during offload bearer modification," 3GPP TSG RAN WG2 Meeting #83 Barcelona, Spain R2-132764, XP050718506, 3rd Generation Partnership Project, Valbonne, France (Aug. 19-23, 2013).

"Data split options and considerations on U-plane protocol architecture for dual-connectivity," 3GPP TSG-RAN WG2 Meeting #81bis Chicago, USA, R2-131054, XP050699230, 3rd Generation Partnership Project, Valbonne France (Apr. 15-19, 2013).

* cited by examiner

RLC DATA PACKET OFFLOADING METHOD AND BASE STATION

CROSS-REFERENCE TO RELATED APPLICATIONS

This application is a continuation of International Application No. PCT/CN2015/093233, filed on Oct. 29, 2015, which claims priority to International Application No. PCT/CN2015/072572, filed on Feb. 9, 2015 and International Application No. PCT/CN2015/088049, filed on Aug. 25, 2015. All of the aforementioned patent applications are hereby incorporated by reference in their entireties.

TECHNICAL FIELD

Embodiments of the present invention relate to the field of communications technologies, and in particular, to an RLC data packet offloading method and a base station.

BACKGROUND

A Long Term Evolution (LTE) system includes an evolved packet core (EPC), an evolved NodeB (eNodeB), and user equipment (UE). The EPC is a core network part, and includes a mobility management entity (MME) that is responsible for signaling processing and a serving gateway (SGW) that is responsible for data processing. The eNodeB is connected to the EPC by using an S1 interface, eNodeBs are connected by using an X2 interface, and the eNodeB is connected to the UE by using a Uu interface.

An evolved universal terrestrial radio access network (E-UTRAN) includes eNodeBs and is responsible for implementing a radio-related function. An E-UTRAN protocol framework includes a user plane protocol and a control plane protocol. A user plane protocol stack includes a Packet Data Convergence Protocol (PDCP) layer, a Radio Link Control (RLC) layer, and a Media Access Control (MAC) layer.

Referring to FIG. 1, in the prior art, a data packet may be transmitted from a PDCP entity to an RLC entity. The RLC entity may include a transparent mode (TM), an unacknowledged mode (UM), and an acknowledged mode (AM). The RLC entity shown in FIG. 1 is an AM RLC entity.

For a carrier aggregation (CA) scenario of an ideal backhaul heterogeneous network (HetNet), an AM RLC entity may offload data packets to a macro eNodeB to which a primary cell (Pcell) belongs and a micro eNodeB to which a secondary cell (Scell) belongs, so as to separately send the data packets to user equipment (UE) by using the primary cell and the secondary cell, and improve data sending efficiency.

In an actual network, transmission between a Macro eNodeB and a Micro eNodeB is generally non-ideal backhaul transmission, and because a transmission delay between the Macro eNodeB and the Micro eNodeB is relatively long, performance of UE in a CA scenario of a non-ideal backhaul HetNet is affected.

SUMMARY

Embodiments of the present invention provide an RLC data packet offloading method and a base station, so as to solve a problem that performance of UE in a CA scenario of a non-ideal backhaul HetNet is affected due to a relatively long transmission delay between a macro eNodeB and a micro eNodeB.

A first aspect of the present invention provides an RLC data packet offloading method, including:

receiving, by a macro eNodeB, an RLC data packet request message sent by a micro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB;

determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message;

allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB; and sending, by the macro eNodeB, the RLC data packets of the first quantity to the micro eNodeB.

With reference to the first aspect, in a first possible implementation manner of the first aspect, the method further includes:

sending, by the macro eNodeB, the RLC data packets of the second quantity to the UE by using the primary cell.

With reference to the first possible implementation manner of the first aspect, in a second possible implementation manner of the first aspect, the method further includes:

receiving, by the macro eNodeB by using the primary cell, ACK/NACK information sent by the UE, where the ACK/NACK information includes feedback information of the UE for the RLC data packets of the first quantity and feedback information of the UE for the RLC data packets of the second quantity.

With reference to the second possible implementation manner of the first aspect, in a third possible implementation manner of the first aspect, after the receiving, by the macro eNodeB by using the primary cell, ACK/NACK information sent by the UE, the method further includes:

if the feedback information that is for the RLC data packets of the first quantity and that is received by the macro eNodeB includes an NACK, determining, by the macro eNodeB, whether an HARQ combination gain can be obtained by performing, by the micro eNodeB by using the secondary cell, an HARQ on an RLC data packet corresponding to the NACK; and if the HARQ combination gain can be obtained, sending, by the macro eNodeB, the NACK to the micro eNodeB, and instructing the micro eNodeB to retransmit the RLC data packet to the UE in an HARQ manner.

With reference to the third possible implementation manner of the first aspect, in a fourth possible implementation manner of the first aspect, the determining, by the macro eNodeB, whether an HARQ combination gain can be obtained by performing, by the micro eNodeB by using the secondary cell, an HARQ on an RLC data packet corresponding to the NACK specifically includes:

when the macro eNodeB determines that a quantity of HARQ processes currently used by the micro eNodeB in the secondary cell is less than a maximum quantity of HARQ processes, determining, by the macro eNodeB, that the HARQ combination gain can be obtained by performing, by the micro eNodeB by using the secondary cell, the HARQ on the RLC data packet corresponding to the NACK.

With reference to the third possible implementation manner or the fourth possible implementation manner of the first aspect, in a fifth possible implementation manner of the first aspect, the method further includes:

if the macro eNodeB determines that the HARQ combination gain cannot be obtained by performing, by the micro eNodeB by using the secondary cell, the HARQ on the RLC data packet corresponding to the NACK, retransmitting, by the macro eNodeB by using the primary cell, the RLC data packet corresponding to the NACK to the UE in an ARQ manner.

With reference to the fifth possible implementation manner of the first aspect, in a sixth possible implementation manner of the first aspect, before the receiving, by the macro eNodeB by using the primary cell, ACK/NACK information sent by the UE, the method further includes:

receiving, by the macro eNodeB, an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity; and the retransmitting, by the macro eNodeB by using the primary cell, the RLC data packet corresponding to the NACK to the UE in an ARQ manner specifically includes:

retransmitting, by the macro eNodeB according to the RLC packet assembly result by using the primary cell, the RLC data packet corresponding to the NACK to the UE in the ARQ manner.

With reference to the third possible implementation manner or the fourth possible implementation manner of the first aspect, in a seventh possible implementation manner of the first aspect, the method further includes:

if the macro eNodeB determines that the HARQ combination gain cannot be obtained by performing, by the micro eNodeB by using the secondary cell, the HARQ on the RLC data packet corresponding to the NACK, sending, by the macro eNodeB, the NACK to the micro eNodeB, and instructing the micro eNodeB to retransmit, by using the secondary cell, the RLC data packet corresponding to the NACK to the UE in an ARQ manner.

A second aspect of the present invention provides an RLC data packet offloading method, including:

sending, by a micro eNodeB, an RLC data packet request message to a macro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB;

receiving, by the micro eNodeB, the RLC data packets of the first quantity sent by the macro eNodeB, where a process of determining the RLC data packets of the first quantity includes: determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

With reference to the second aspect, in a first possible implementation manner of the second aspect, the method further includes:

receiving, by the micro eNodeB, feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

With reference to the first possible implementation manner of the second aspect, in a second possible implementation manner of the second aspect, before the receiving, by the micro eNodeB, feedback information that is sent by the macro eNodeB and that is of the UE for a part or all of the RLC data packets of the first quantity, the method further includes:

sending, by the micro eNodeB, an RLC packet assembly result to the macro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity.

A third aspect of the present invention provides a macro eNodeB, including:

a first receiving module, configured to receive an RLC data packet request message sent by a micro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB;

a determining module, configured to determine, according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message;

an allocation module, configured to allocate, in ascending order of serial numbers of to-be-sent RLC data packets, first RLC data packets of the second quantity in the to-be-sent RLC data packets to the macro eNodeB, and allocate, starting from a first RLC data packet whose serial number follows serial numbers of the first RLC data packets of the second quantity, the RLC data packets of the first quantity to the micro eNodeB; and a first sending module, configured to send the RLC data packets of the first quantity to the micro eNodeB.

With reference to the third aspect, in a first possible implementation manner of the third aspect, the macro eNodeB further includes a second sending module, and the second sending module is configured to:

send the RLC data packets of the second quantity to the UE by using the primary cell.

With reference to the first possible implementation manner of the third aspect, in a second possible implementation manner of the third aspect, the macro eNodeB further includes a second receiving module, and the second receiving module is configured to:

receive, by using the primary cell, ACK/NACK information sent by the UE, where the ACK/NACK information includes feedback information of the UE for the RLC data packets of the first quantity and feedback information of the UE for the RLC data packets of the second quantity.

With reference to the second possible implementation manner of the third aspect, in a third possible implementation manner of the third aspect, the macro eNodeB further includes a judgment module, configured to: after the second receiving module receives, by using the primary cell, the ACK/NACK information sent by the UE, if the feedback information that is in the ACK/NACK information and that is for the RLC data packets of the first quantity includes an NACK, determine whether an HARQ combination gain can be obtained by performing, by the micro eNodeB by using the secondary cell, an HARQ on an RLC data packet corresponding to the NACK; and the first sending module is further configured to: if the HARQ combination gain can be obtained, send the NACK to the micro eNodeB, and instruct the micro eNodeB to retransmit the RLC data packet to the UE in an HARQ manner.

With reference to the third possible implementation manner of the third aspect, in a fourth possible implementation manner of the third aspect, the judgment module is specifically configured to:

when it is determined that a quantity of HARQ processes currently used by the micro eNodeB in the secondary cell is less than a maximum quantity of HARQ processes, determine that the HARQ combination gain can be obtained by performing, by the micro eNodeB by using the secondary cell, the HARQ on the RLC data packet corresponding to the NACK.

With reference to the third possible implementation manner or the fourth possible implementation manner of the third aspect, in a fifth possible implementation manner of the third aspect, the macro eNodeB further includes a retransmission module, configured to:

if the judgment module determines that the HARQ combination gain cannot be obtained by performing, by the micro eNodeB by using the secondary cell, the HARQ on the RLC data packet corresponding to the NACK, retransmit, by using the primary cell and by using the second sending module, the RLC data packet corresponding to the NACK to the UE in an ARQ manner.

With reference to the fifth possible implementation manner of the third aspect, in a sixth possible implementation manner of the third aspect, the first receiving module is specifically configured to:

before the second receiving module receives, by using the primary cell, the ACK/NACK information sent by the UE, receive an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity; and the retransmission module is specifically configured to retransmit, according to the RLC packet assembly result by using the primary cell and by using the second sending module, the RLC data packet corresponding to the NACK to the UE in the ARQ manner.

With reference to the third possible implementation manner or the fourth possible implementation manner of the third aspect, in a seventh possible implementation manner of the third aspect, the first sending module is further configured to:

if the judgment module determines that the HARQ combination gain cannot be obtained by performing, by the micro eNodeB by using the secondary cell, the HARQ on the RLC data packet corresponding to the NACK, send the NACK to the micro eNodeB, and instruct the micro eNodeB to retransmit, by using the secondary cell, the RLC data packet corresponding to the NACK to the UE in an ARQ manner.

A fourth aspect of the present invention provides a micro eNodeB, including:

a first sending module, configured to send an RLC data packet request message to a macro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB by using the first sending module at a first moment; a time difference between the first moment and a second moment is T, and T is greater than or equal to 2t; the second moment is a moment at which the micro eNodeB sends RLC data packets of the first quantity to the UE by using a second sending module; and t is a unidirectional transmission delay between the micro eNodeB and the macro eNodeB; and a first receiving module, configured to receive the RLC data packets of the first quantity sent by the macro eNodeB, where a process of determining the RLC data packets of the first quantity includes: determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

With reference to the fourth aspect, in a first possible implementation manner of the fourth aspect, the first receiving module is further configured to:

receive feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

With reference to the first possible implementation manner of the fourth aspect, in a second possible implementation manner of the fourth aspect, the first sending module is further configured to:

before the first receiving module receives the feedback information that is sent by the macro eNodeB and that is of the UE for a part or all of the RLC data packets of the first quantity, send an RLC packet assembly result to the macro eNodeB, where the RLC packet assembly result is used to indicate information about an RLC data packet that is transmitted by the micro eNodeB to the UE by using the secondary cell and by using the second sending module, and the RLC data packet that is transmitted by the micro eNodeB to the UE by using the secondary cell and by using the second sending module comprises a part or all of the RLC data packets of the first quantity.

A fifth aspect of the present invention provides a macro eNodeB, including a memory, a processor, and an interface, where:

the memory is configured to store an instruction;

the interface is configured to receive an RLC data packet request message sent by a micro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB;

the processor invokes the instruction of the memory to determine, according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocate, in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB; and the processor is further configured to send the RLC data packets of the first quantity to the micro eNodeB by using the interface.

With reference to the fifth aspect, in a first possible implementation manner of the fifth aspect, the macro eNodeB further includes a transceiver; and the processor is further configured to:

send the RLC data packets of the second quantity to the UE by using the primary cell and by using the transceiver.

With reference to the first possible implementation manner of the fifth aspect, in a second possible implementation manner of the fifth aspect, the transceiver is further configured to:

receive, by using the primary cell, ACK/NACK information sent by the UE, where the ACK/NACK information includes feedback information of the UE for the RLC data packets of the first quantity and feedback information of the UE for the RLC data packets of the second quantity.

With reference to the second possible implementation manner of the fifth aspect, in a third possible implementation manner of the fifth aspect, the processor is further configured to:

after the transceiver receives, by using the primary cell, the ACK/NACK information sent by the UE, if the feedback information that is in the ACK/NACK information and that is for the RLC data packets of the first quantity includes an NACK, determine whether an HARQ combination gain can be obtained by performing, by the micro eNodeB by using the secondary cell, an HARQ on an RLC data packet corresponding to the NACK; and if the HARQ combination gain can be obtained, send the NACK to the micro eNodeB by using the interface and instruct the micro eNodeB to retransmit the RLC data packet to the UE in an HARQ manner.

With reference to the third possible implementation manner of the fifth aspect, in a fourth possible implementation manner of the fifth aspect, that the processor is further configured to determine whether an HARQ combination gain can be obtained by performing, by the micro eNodeB by using the secondary cell, an HARQ on an RLC data packet corresponding to the NACK is specifically:

when it is determined that a quantity of HARQ processes currently used by the micro eNodeB in the secondary cell is less than a maximum quantity of HARQ processes, determining that the HARQ combination gain can be obtained by performing, by the micro eNodeB by using the secondary cell, the HARQ on the RLC data packet corresponding to the NACK.

With reference to the third possible implementation manner or the fourth possible implementation manner of the fifth aspect, in a fifth possible implementation manner of the fifth aspect, the processor is further configured to:

if it is determined that the HARQ combination gain cannot be obtained by performing, by the micro eNodeB by using the secondary cell, the HARQ on the RLC data packet corresponding to the NACK, retransmit, by using the primary cell and by using the transceiver, the RLC data packet corresponding to the NACK to the UE in an ARQ manner.

With reference to the fifth possible implementation manner of the fifth aspect, in a sixth possible implementation manner of the fifth aspect, the interface is further configured to: before the transceiver receives, by using the primary cell, the ACK/NACK information sent by the UE, receive an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity; and that the processor is further configured to retransmit, by using the primary cell and by using the transceiver, the RLC data packet corresponding to the NACK to the UE in an ARQ manner is specifically: retransmitting, according to the RLC packet assembly result by using the primary cell and by using the transceiver, the RLC data packet corresponding to the NACK to the UE in the ARQ manner.

With reference to the third possible implementation manner or the fourth possible implementation manner of the fifth aspect, in a seventh possible implementation manner of the fifth aspect, the processor is further configured to:

if it is determined that the HARQ combination gain cannot be obtained by performing, by the micro eNodeB by using the secondary cell, the HARQ on the RLC data packet corresponding to the NACK, send the NACK to the micro eNodeB by using the interface, and instruct the micro eNodeB to retransmit, by using the secondary cell, the RLC data packet corresponding to the NACK to the UE in an ARQ manner.

A sixth aspect of the present invention provides a micro eNodeB, including a memory, a processor, an interface, and a transceiver, where:

the memory is configured to store an instruction;

the processor invokes the instruction stored in the memory to send an RLC data packet request message to a macro eNodeB by using the interface, where: the RLC data packet request message is used by the micro eNodeB to request, from the macro eNodeB, a first quantity of RLC data packets that are to be sent by the micro eNodeB to CA UE by using a secondary cell; the RLC data packet request message is sent by the processor to the macro eNodeB by using the interface at a first moment; a time difference between the first moment and a second moment is T, and T is greater than or equal to 2t; the second moment is a moment at which the processor sends RLC data packets of the first quantity to the UE by using the transceiver; and t is a unidirectional transmission delay between the micro eNodeB and the macro eNodeB; and the interface is configured to receive the RLC data packets of the first quantity sent by the macro eNodeB, where a process of determining the RLC data packets of the first quantity includes: determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

With reference to the sixth aspect, in a first possible implementation manner of the sixth aspect, the interface is further configured to:

receive feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

With reference to the first possible implementation manner of the sixth aspect, in a second possible implementation manner of the sixth aspect, the processor is further configured to:

before the interface receives the feedback information that is sent by the macro eNodeB and that is of the UE for a part or all of the RLC data packets of the first quantity, send an RLC packet assembly result to the macro eNodeB by using the interface, where the RLC packet assembly result is used to indicate information about an RLC data packet that is transmitted by the processor to the UE by using the secondary cell and by using the transceiver, and the RLC data packet that is transmitted by the processor to the UE by using the secondary cell and by using the transceiver comprises a part or all of the RLC data packets of the first quantity.

In the embodiments of the present invention, a micro eNodeB may request a required RLC data packet at the first moment before a moment at which the RLC data packet is sent to UE; in this way, a macro eNodeB can send, to the micro eNodeB in advance, the RLC data packet required by the micro eNodeB; therefore a transmission delay between the macro eNodeB and the micro eNodeB is reduced as much as possible, and receiving performance of UE in a CA scenario of a non-ideal backhaul HetNet is improved.

In addition, in the embodiments of the present invention, a macro eNodeB uses duration of t to receive an RLC data packet request message of a micro eNodeB, determines RLC data packets of the second quantity that can be sent by the macro eNodeB in duration from a current moment to the second moment, allocates, to the macro eNodeB, first RLC data packets of the second quantity whose serial numbers come first, and allocates, to the micro eNodeB, RLC data packets of a first quantity whose serial numbers follow the serial numbers of the RLC data packets of the second quantity; and then the macro eNodeB starts to send the RLC data packets of the second quantity to UE. Because duration required by the macro eNodeB to send the RLC data packets of the second quantity is the duration from the current moment to the second moment, when the macro eNodeB completes sending of the data packets of the second quantity, the micro eNodeB exactly receives and starts to send the RLC data packets of the first quantity, and serial numbers of these RLC data packets are in sequential order, which ensures that the RLC data packets are sent in sequence, avoids that the UE is incapable of decoding the RLC data packets due to receiving of out-of-order RLC data packets, and further improves receiving performance of the UE.

DESCRIPTION OF EMBODIMENTS

Figure 1:
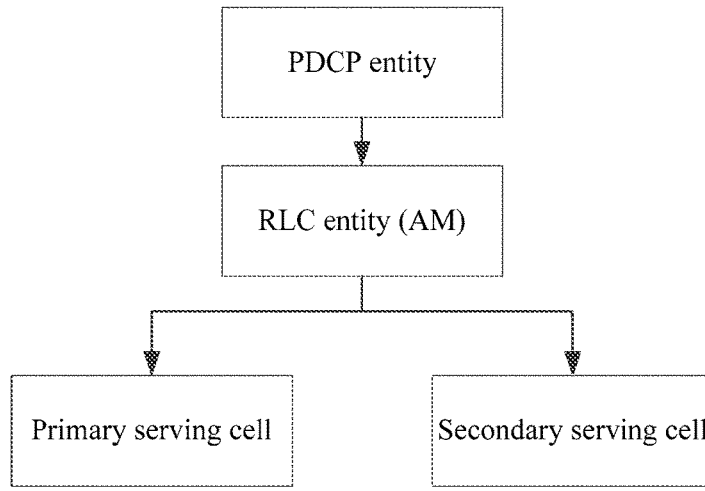
FIG. 1 is a schematic diagram of transmitting an RLC data packet in an AM in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technologies described in this specification may be applied to a Universal Mobile Telecommunications System (UMTS), an LTE system, and a subsequent evolved system of LTE.

A first base station receives an RLC data packet request message sent by a second base station, where: the RLC data packet request message is used by the second base station to request, from the first base station, a first quantity of RLC data packets that are to be sent by the second base station to CA UE by using a secondary cell; the RLC data packet request message is sent by the second base station to the first base station at a first moment; a time difference between the first moment and a second moment is greater than or equal to 2t; the second moment is a moment at which the second base station sends RLC data packets of the first quantity to the UE; and t is a unidirectional transmission delay between the second base station and the first base station.

The first base station determines, according to the RLC data packet request message, a second quantity of RLC data packets that are to be sent by the first base station to the UE by using a primary cell.

The first base station allocates, in ascending order of serial numbers of to-be-sent RLC data packets, first RLC data packets of the second quantity in the to-be-sent RLC data packets to the first base station, and allocates, starting from a first RLC data packet whose serial number follows serial numbers of the first RLC data packets of the second quantity, the RLC data packets of the first quantity to the second base station.

The first base station sends the RLC data packets of the first quantity to the second base station.

A second base station sends an RLC data packet request message to a first base station, where the RLC data packet request message is used by the second base station to request, from the first base station, a first quantity of RLC data packets that are to be sent by the second base station to CA UE by using a secondary cell; the RLC data packet request message is sent by the second base station to the first base station at a first moment; a time difference between the first moment and a second moment is greater than or equal to 2t; the second moment is a moment at which the second base station sends RLC data packets of the first quantity to the UE; and t is a unidirectional transmission delay between the second base station and the first base station.

The second base station receives the RLC data packets of the first quantity sent by the first base station, where a process of determining the RLC data packets of the first quantity includes: determining, by the first base station according to the RLC data packet request message, a second quantity of RLC data packets that are to be sent by the first base station to the UE by using a primary cell; and allocating, by the first base station in ascending order of serial numbers of to-be-sent RLC data packets, first RLC data packets of the second quantity in the to-be-sent RLC data packets to the first base station, and allocating, starting from a first RLC data packet whose serial number follows serial numbers of the first RLC data packets of the second quantity, the RLC data packets of the first quantity to the second base station.

In the embodiments of the present invention, an example in which a receive end is UE is used.

A primary cell is a cell operating at a primary frequency band. UE establishes a radio resource control (RRC) connection to a Macro eNodeB by using the primary cell.

A secondary cell is a cell operating at a secondary frequency band. UE with a capability of CA establishes an RRC connection to a Macro eNodeB; therefore, a secondary cell may be configured for the UE to provide an extra radio resource.

In the embodiments of the present invention, a networking scenario with a first base station and a second base station is used for description. The first base station may be a macro eNodeB, or may be a micro eNodeB; likewise, the second base station may also be a macro eNodeB, or may be a micro eNodeB. Types of the first base station and the second base station are not limited in the embodiments of the present invention. For example, both the first base station and the second base station may be macro eNodeBs; both the first base station and the second base station may be micro eNodeBs; the first base station is a macro eNodeB, and the second base station is a micro eNodeB; or the first base station is a micro eNodeB, and the second base station is a macro eNodeB. In the following introduction, an example in which the first base station is a macro eNodeB and the second base station is a micro eNodeB is used.

It should be noted that, for ease of description, a scenario in which a HetNet is networked by using a macro eNodeB and a micro eNodeB is used to describe the embodiments of the present invention. In some application scenarios, the macro eNodeB introduced in the embodiments of the present invention may be replaced with the micro eNodeB; likewise, in some application scenarios, the micro eNodeB introduced in the embodiments of the present invention may be replaced with the macro eNodeB. That is, technical solutions in the embodiments of the present invention are also applicable to a scenario in which networking is implemented between macro eNodeBs and a scenario in which networking is implemented between micro eNodeBs.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, unless otherwise stated, the character "/" in this specification generally indicates an "or" relationship between the associated objects.

The following further describes the embodiments of the present invention in detail with reference to the accompanying drawings for the specification.

Figure 2:
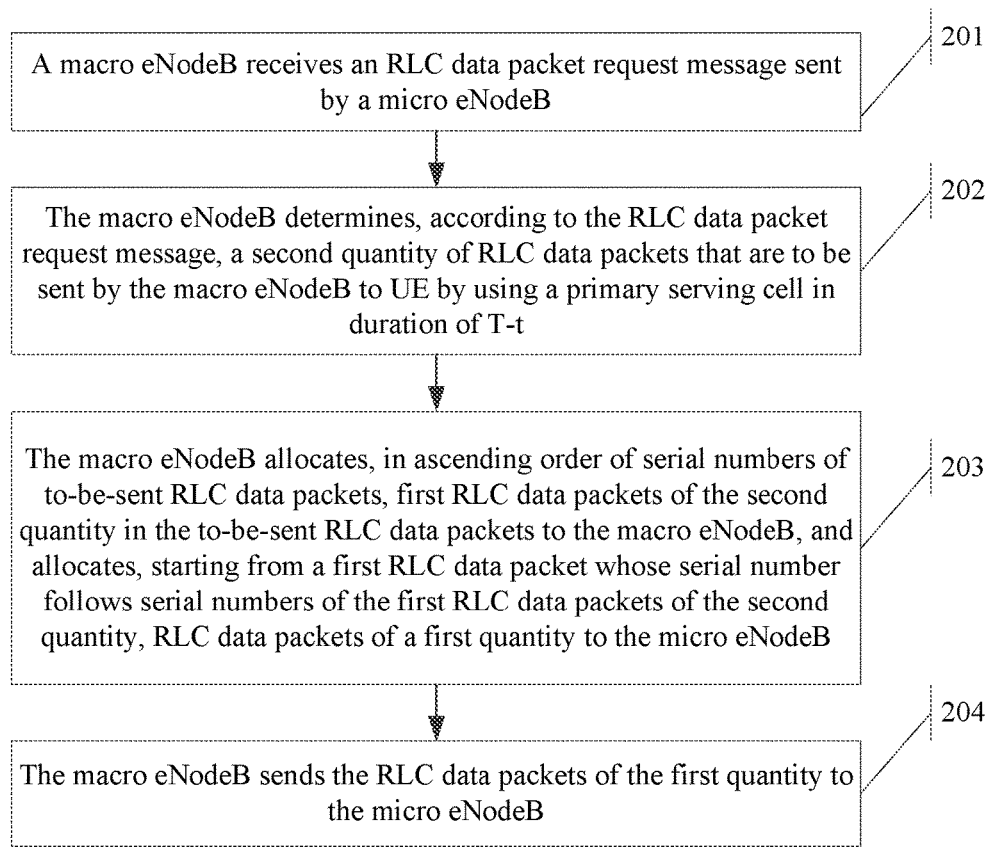
FIG. 2 is a main flowchart of an RLC data packet offloading method on a macro eNodeB side according to an embodiment of the present invention.

Referring to FIG. 2, an embodiment of the present invention provides an RLC data packet offloading method. A main procedure of the method is described as follows:

Step 201: A macro eNodeB receives an RLC data packet request message sent by a micro eNodeB.

The RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB.

Optionally, the unidirectional transmission delay may be acquired by measuring receiving and transmitting of a data packet with a time stamp. Another method for acquiring the unidirectional transmission delay also falls within the protection scope of the embodiments of the present invention.

Optionally, the micro eNodeB determines, according to any one or a combination of radio channel quality between the micro eNodeB and the CA UE, cell load of the secondary cell of the micro eNodeB, and spectral efficiency of the CA UE in the secondary cell, the first quantity of RLC data packets that are to be sent by the micro eNodeB to the CA UE at the second moment. The micro eNodeB sends the first quantity to the macro eNodeB by using the RLC data packet request message, which is used by the micro eNodeB to request the RLC data packets of the first quantity from the macro eNodeB.

Optionally, the micro eNodeB sends radio channel quality between the micro eNodeB and the CA UE, cell load of the secondary cell of the micro eNodeB, and spectral efficiency of the CA UE in the secondary cell to the macro eNodeB by using the RLC data packet request message, which is used by the micro eNodeB to request the RLC data packets of the first quantity from the macro eNodeB. The macro eNodeB determines, according to any one or a combination of the received radio channel quality between the micro eNodeB and the CA UE, cell load of the secondary cell of the micro eNodeB, and spectral efficiency of the CA UE in the secondary cell, the first quantity of RLC data packets that can be sent by the micro eNodeB to the CA UE at the second moment. Further, the macro eNodeB may further comprehensively consider any one or a combination of radio channel quality between the macro eNodeB and the CA UE, cell load of a primary cell of the macro eNodeB, and spectral efficiency of the CA UE in the primary cell, so that the first quantity of RLC data packets that can be sent by the micro eNodeB to the CA UE at the second moment is determined.

The radio channel quality may be a channel quality indicator (CQI), a signal to interference plus noise ratio (SINR), reference signal received power (RSRP), or reference signal received quality (RSRQ).

Another parameter used by a base station to determine a quantity of RLC data packets to be sent to UE, such as a scheduling delay or a size of a data packet to be scheduled, also falls within the protection scope of the embodiments of the present invention.

In this embodiment of the present invention, UE with a capability of CA is referred to as CA UE.

Optionally, before step 201, the method further includes:
UE with a capability of CA is enabled to preferentially camp on the macro eNodeB, that is, the UE with the capability of CA is enabled to use a cell of the macro eNodeB as a primary cell of the UE with the capability of CA.

After the UE is enabled to preferentially camp on the macro eNodeB, when the UE initiates service bearer establishment to a base station (that is, the macro eNodeB) in the primary cell, the macro eNodeB establishes an RLC data service logical channel that is in an AM and that is between the macro eNodeB and the UE, and establishes an RLC data service logical channel that is in an AM and that is between the micro eNodeB and the UE. A cell of the micro eNodeB is a secondary cell of the UE.

Specifically, enabling the UE with the capability of CA to preferentially camp on the macro eNodeB and separately establishing, by the macro eNodeB, RLC data service logical channels are processes in the prior art; for a specific implementation manner, reference may be made to the prior art, which is not limited by the present invention.

In this embodiment of the present invention, the micro eNodeB knows when to send an RLC data packet to the UE, and at the first moment before the RLC data packet starts to be sent to the UE, the micro eNodeB may first send the RLC data packet request message to the macro eNodeB, where the RLC data packet request message is used to request the macro eNodeB to send the RLC data packet to the micro eNodeB. In this embodiment of the present invention, a quantity of RLC data packets required by the micro eNodeB is referred to as the first quantity.

In this embodiment of the present invention, the time difference T between the first moment and the second moment is greater than or equal to 2t. Preferably, the time difference T between the first moment and the second moment is equal to 2t.

Step 202: The macro eNodeB determines, according to the RLC data packet request message, a second quantity of RLC data packets that are to be sent by the macro eNodeB to the UE by using a primary cell in duration of T−t.

After receiving the RLC data packet request message, the macro eNodeB determines the second quantity of RLC data packets that are to be sent by the macro eNodeB to the CA UE by using the primary cell in the duration of T−t, where a start time of the duration of T−t is a moment at which the macro eNodeB receives the RLC data packet request message.

The macro eNodeB determines, according to any one or a combination of radio channel quality between the macro eNodeB and the CA UE, the cell load of the primary cell of the macro eNodeB, and the spectral efficiency of the CA UE in the primary cell, RLC data packets that can be transmitted by the macro eNodeB in the foregoing duration, that is, the macro eNodeB determines the second quantity of RLC data packets that are to be sent by the macro eNodeB to the CA UE by using the primary cell.

If the time difference between the first moment and the second moment is equal to 2t, a time difference between the moment at which the macro eNodeB receives the RLC data packet request message and the second moment is t.

After receiving the RLC data packet request message, the macro eNodeB determines how many RLC data packets can be transmitted by the macro eNodeB in duration from a current moment to the second moment and how many serial number (SN) resources need to be consumed in the duration from the current moment to the second moment, for example, in this embodiment of the present invention, a quantity of RLC data packets that can be transmitted by the macro eNodeB in the duration is referred to as the second quantity. Each RLC data packet may have a serial number, and both the macro eNodeB and the micro eNodeB send RLC data packets in sequence according to serial numbers of the RLC data packets. A resource consumed to add a serial number for each RLC data packet is an SN resource.

For example, if the time difference between the first moment and the second moment is equal to 2t, the macro eNodeB needs to determine a quantity of RLC data packets that can be transmitted by the macro eNodeB and consumed SN resources in future duration of t, that is, the second quantity is the quantity of RLC data packets that can be transmitted by the macro eNodeB in the future duration oft. A start time of the future duration oft described herein is the moment at which the macro eNodeB receives the RLC data packet request message.

Step 203: The macro eNodeB allocates, in ascending order of serial numbers of to-be-sent RLC data packets, first RLC data packets of the second quantity in the to-be-sent RLC data packets to the macro eNodeB, and allocates, starting from a first RLC data packet whose serial number follows serial numbers of the first RLC data packets of the second quantity, the RLC data packets of the first quantity to the micro eNodeB.

For example, the macro eNodeB determines that the second quantity is 50, that is, the macro eNodeB is going to send 50 RLC data packets in duration from the current moment to the second moment; and determines that the quantity of RLC data packets required by the micro eNodeB is 30. Then the macro eNodeB allocates, in ascending order of serial numbers of to-be-sent RLC data packets and starting from a first to-be-sent RLC data packet, first 50 RLC data packets to the macro eNodeB, and allocates, starting from the $51^{st}$ data packet, 30 RLC data packets to the micro eNodeB.

Step 204: The macro eNodeB sends the RLC data packets of the first quantity to the micro eNodeB.

That is, after allocating the RLC data packets of the first quantity to the micro eNodeB, the macro eNodeB sends the RLC data packets of the first quantity to the micro eNodeB. When the micro eNodeB receives the RLC data packets of the first quantity, if the second moment arrives, the micro eNodeB may directly start to send the RLC data packets of the first quantity to the UE in sequence according to the serial numbers of the RLC data packets.

Preferably, if the time difference between the first moment and the second moment is equal to 2t, a moment at which the micro eNodeB receives the RLC data packets of the first quantity may exactly be the second moment, and the micro eNodeB may immediately send the RLC data packets upon receiving the RLC data packets; therefore, a step in which the micro eNodeB needs to temporarily store the RLC data packets is omitted, and storage resources are saved.

Optionally, in this embodiment of the present invention, the method further includes:

sending, by the macro eNodeB, the RLC data packets of the second quantity to the UE by using the primary cell.

That is, after determining the RLC data packets of the second quantity that are to be allocated to the macro eNodeB, the macro eNodeB may directly send the RLC data packets of the second quantity to the UE.

For example, the time difference between the first moment and the second moment is equal to 2t. The macro eNodeB determines that the second quantity is 50, that is, the macro eNodeB is going to send 50 RLC data packets in duration from the current moment to the second moment; and determines that the quantity of RLC data packets required by the micro eNodeB is 30. Then the macro eNodeB allocates, in ascending order of serial numbers of to-be-sent RLC data packets and starting from a first to-be-sent RLC data packet, first 50 RLC data packets to the macro eNodeB, and allocates, starting from the $51^{st}$ data packet, 30 RLC data packets to the micro eNodeB.

After allocating the first 50 RLC data packets to the macro eNodeB, the macro eNodeB may directly send the first 50 RLC data packets to the UE in sequence according to serial numbers of the RLC data packets. When the $50^{th}$ RLC data packet is sent by the macro eNodeB, the micro eNodeB exactly receives the subsequent 30 RLC data packets, and the second moment exactly arrives, the micro eNodeB starts to send the $51^{st}$ RLC data packet to the UE in sequence according to the serial numbers of the RLC data packets. Therefore, the RLC data packets are received by the UE in sequence, which avoids that decoding by UE is affected due to occurrence of a case in which received RLC data packets are out of order, and improves receiving performance of the UE. In addition, a delay in a sending process is relatively short, which improves sending efficiency.

In this embodiment of the present invention, a macro eNodeB uses duration oft to receive an RLC data packet request message of a micro eNodeB, determines RLC data packets of the second quantity that can be sent by the macro eNodeB in duration from a current moment to the second moment, allocates, to the macro eNodeB, first RLC data packets of the second quantity whose serial numbers come first, and allocates, to the micro eNodeB, RLC data packets of a first quantity whose serial numbers follow the serial numbers of the RLC data packets of the second quantity; and then the macro eNodeB starts to send the RLC data packets of the second quantity to UE. Because duration required by the macro eNodeB to send the RLC data packets of the second quantity is the duration from the current moment to the second moment, when the macro eNodeB completes sending of the data packets of the second quantity, the micro eNodeB exactly receives and starts to send the RLC data packets of the first quantity, and serial numbers of these RLC data packets are in sequential order, which ensures that the RLC data packets are sent in sequence, avoids that the UE is incapable of decoding the RLC data packets due to receiving of out-of-order RLC data packets, and further improves receiving performance of the UE.

In this embodiment of the present invention, an example in which a receive end is UE is used; when attempting to send an RLC data packet to the UE, both the macro eNodeB and the micro eNodeB can send the RLC data packet to an air interface, and the UE receives the RLC data packet by using the air interface.

After receiving the RLC data packet, the UE needs to feed back acknowledgement (ACK)/negative acknowledgement (NACK) information to the macro eNodeB according to correctness of the received RLC data packet.

Optionally, in this embodiment of the present invention, the method further includes:

receiving, by the macro eNodeB by using the primary cell, ACK/NACK information sent by the UE, where the ACK/NACK information includes feedback information of the UE for the RLC data packets of the first quantity and feedback information of the UE for the RLC data packets of the second quantity.

Optionally, in this embodiment of the present invention, before the receiving, by the macro eNodeB by using the primary cell, ACK/NACK information sent by the UE, the method further includes:

receiving, by the macro eNodeB, an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity.

For the RLC data packets of the first quantity that are allocated by the macro eNodeB to the micro eNodeB, the micro eNodeB may transmit, to the UE, all the RLC data packets of the first quantity that are allocated by the macro eNodeB to the micro eNodeB, but may transmit, to the UE, only a part of the RLC data packets of the first quantity that are allocated by the macro eNodeB to the micro eNodeB. For example, the macro eNodeB allocates three RLC data packets to the micro eNodeB in total, for example, an RLC data packet 1, an RLC data packet 2, and an RLC data packet 3, respectively. The micro eNodeB may transmit all the three RLC data packets to the UE, and the RLC packet assembly result is used to indicate information about the three RLC data packets; or the micro eNodeB may transmit only the RLC data packet 1 and the RLC data packet 2 of the three RLC data packets to the UE, and the RLC packet assembly result is used to indicate information about the RLC data packet 1 and the RLC data packet 2; or the micro eNodeB may transmit only the RLC data packet 1 and a part of data in the RLC data packet 2 to the UE, and the RLC packet assembly result is used to indicate information about the RLC data packet 1 and the part of data that is in the RLC data packet 2 and that is transmitted to the UE.

That is, although the macro eNodeB knows which RLC data packets have been allocated to the micro eNodeB, for specific RLC data packets that have been transmitted by the micro eNodeB to the UE, the macro eNodeB needs to be notified by the micro eNodeB by using the RLC packet assembly result.

For example, when sending the allocated RLC data packets to a receive end (if the receive end is UE, sending the allocated RLC data packets to an air interface), the micro eNodeB may send the RLC packet assembly result to the macro eNodeB. In this way, the macro eNodeB may know which RLC data packets have been transmitted by the micro eNodeB to the UE.

Optionally, in this embodiment of the present invention, after the receiving, by the macro eNodeB by using the primary cell, ACK/NACK information sent by the UE, the method further includes:

if the feedback information that is for the RLC data packets of the first quantity and that is received by the macro eNodeB includes an NACK, determining, by the macro eNodeB, whether an HARQ combination gain can be obtained by performing, by the micro eNodeB by using the secondary cell, a hybrid automatic repeat request (HARQ) on an RLC data packet corresponding to the NACK; and if the HARQ combination gain can be obtained, sending, by the macro eNodeB, the NACK to the micro eNodeB, and instructing the micro eNodeB to retransmit the RLC data packet to the UE in an HARQ manner.

If the macro eNodeB determines that the received feedback information for the RLC data packets transmitted by the micro eNodeB is an NACK, the macro eNodeB determines that an RLC data packet corresponding to the NACK needs to be retransmitted.

If the macro eNodeB determines that the RLC data packet corresponding to the NACK needs to be retransmitted, the macro eNodeB may first determine whether the HARQ combination gain can be obtained by performing, by the micro eNodeB by using the secondary cell, the HARQ on the RLC data packet. For example, the micro eNodeB transmits three RLC data packets to the UE in total, which are an RLC data packet 1, an RLC data packet 2, and an RLC data packet 3, respectively, and then the UE sends feedback information for the three RLC data packets to the macro eNodeB. For example, for the RLC data packet 2 in the three RLC data packets, feedback information sent by the UE is an NACK. The macro eNodeB determines whether the HARQ combination gain can be obtained by performing, by the micro eNodeB by using the secondary cell, the HARQ on the RLC data packet 2; if the macro eNodeB determines that the HARQ combination gain can be obtained by performing, by the micro eNodeB by using the secondary cell, the HARQ on the RLC data packet 2, the macro eNodeB sends the NACK corresponding to the RLC data packet 2 to the micro eNodeB, and instructs the micro eNodeB to retransmit the RLC data packet 2 in the HARQ manner.

Certainly, if the feedback information that is for the RLC data packets of the first quantity and that is received by the macro eNodeB includes an ACK, the macro eNodeB directly sends the ACK to the micro eNodeB. For example, for both the RLC data packet 1 and the RLC data packet 3 in the three RLC data packets, feedback information sent by the UE is ACKs. The macro eNodeB sends both an ACK corresponding to the RLC data packet 1 and an ACK corresponding to the RLC data packet 3 to the micro eNodeB.

Optionally, in this embodiment of the present invention, the determining, by the macro eNodeB, whether an HARQ combination gain can be obtained by performing, by the micro eNodeB by using the secondary cell, an HARQ on an RLC data packet corresponding to the NACK specifically includes:

when the macro eNodeB determines that a quantity of HARQ processes currently used by the micro eNodeB in the secondary cell is less than a maximum quantity of HARQ processes, determining, by the macro eNodeB, that the HARQ combination gain can be obtained by performing, by the micro eNodeB by using the secondary cell, the HARQ on the RLC data packet corresponding to the NACK.

If the quantity of HARQ processes currently used by the micro eNodeB in the secondary cell is less than the maximum quantity of HARQ processes, it indicates that an idle HARQ process exists, and the macro eNodeB may send the NACK to the micro eNodeB, and instruct the micro eNodeB to retransmit the RLC data packet corresponding to the NACK in the HARQ manner. After receiving the NACK and an instruction that are sent by the macro eNodeB, where the instruction is used to instruct the micro eNodeB to retransmit the RLC data packet corresponding to the NACK in the HARQ manner, the micro eNodeB retransmits, by using the secondary cell, the RLC data packet corresponding to the NACK to the UE in the HARQ manner. The micro eNodeB may directly use the idle HARQ process to retransmit the RLC data packet corresponding to the NACK, and a relatively short retransmission delay may not affect throughput of the UE basically; therefore, the UE can normally obtain the HARQ combination gain.

However, if the quantity of HARQ processes currently used by the micro eNodeB in the secondary cell is not less than the maximum quantity of HARQ processes, the micro eNodeB needs to wait until an idle HARQ process exists, and then retransmits the RLC data packet corresponding to the NACK to the UE, which leads to a relatively long retransmission delay; in this case, if the micro eNodeB continuously retransmits, by using the secondary cell, the RLC data packet corresponding to the NACK in the HARQ manner, the UE cannot obtain the HARQ combination gain.

Therefore, whether the HARQ combination gain can be obtained by performing, by the micro eNodeB by using the secondary cell, the HARQ on the RLC data packet is determined in this manner.

In this embodiment of the present invention, if the macro eNodeB determines that the HARQ combination gain cannot be obtained by performing, by the micro eNodeB by using the secondary cell, the HARQ on the RLC data packet corresponding to the NACK, the macro eNodeB has two processing manners:

Manner 1: The macro eNodeB retransmits, by using the primary cell and in an automatic repeat request (ARQ) manner by itself, the RLC data packet corresponding to the NACK to the UE.

Manner 2: The macro eNodeB instructs the micro eNodeB to retransmit, by using the secondary cell, the RLC data packet corresponding to the NACK to the UE in an ARQ manner.

The two manners are separately introduced below.

Manner 1:

Optionally, in this embodiment of the present invention, after the determining, by the macro eNodeB, whether an HARQ combination gain can be obtained by performing, by the micro eNodeB by using the secondary cell, an HARQ on an RLC data packet corresponding to the NACK, the method may further include:

if the macro eNodeB determines that the HARQ combination gain cannot be obtained by performing, by the micro eNodeB by using the secondary cell, the HARQ on the RLC data packet corresponding to the NACK, retransmitting, by the macro eNodeB by using the primary cell, the RLC data packet corresponding to the NACK to the UE in the ARQ manner.

Optionally, in this embodiment of the present invention, the retransmitting, by the macro eNodeB by using the primary cell, the RLC data packet corresponding to the NACK to the UE in the ARQ manner specifically includes:

retransmitting, by the macro eNodeB according to the RLC packet assembly result by using the primary cell, the RLC data packet corresponding to the NACK to the UE in the ARQ manner.

That is, if the macro eNodeB determines that the HARQ combination gain cannot be obtained by performing, by the micro eNodeB by using the secondary cell, the HARQ on the RLC data packet corresponding to the NACK, a manner that may be used by the macro eNodeB is: retransmitting the RLC data packet corresponding to the NACK to the UE in the ARQ manner by itself.

Before step 201, the macro eNodeB has obtained the RLC packet assembly result and knows which specific RLC data packets have been transmitted by the micro eNodeB to the UE. Therefore, the macro eNodeB may directly transmit the RLC data packet corresponding to the NACK to the UE in the ARQ manner.

However, in the prior art, although the macro eNodeB needs to retransmit the RLC data packet, the macro eNodeB needs to first wait for an SN status report fed back by the UE, after the SN state report is received, the macro eNodeB knows exactly which RLC data packets have been transmitted by the micro eNodeB to the UE, and then the macro eNodeB can retransmit a part or all of the RLC data packets. It can be seen that, compared with the prior art, the technical solution in this embodiment of the present invention reduces time of RLC service interaction and improves transmission efficiency.

Manner 2:

Optionally, in this embodiment of the present invention, the method may further include:

if the macro eNodeB determines that the HARQ combination gain cannot be obtained by performing, by the micro eNodeB by using the secondary cell, the HARQ on the RLC data packet corresponding to the NACK, sending, by the macro eNodeB, the NACK to the micro eNodeB, and instructing the micro eNodeB to retransmit, by using the secondary cell, the RLC data packet corresponding to the NACK to the UE in the ARQ manner.

If the macro eNodeB determines that the HARQ combination gain cannot be obtained by performing, by the micro eNodeB by using the secondary cell, the HARQ on the RLC data packet corresponding to the NACK, another manner may be used by the macro eNodeB is: sending the NACK to the micro eNodeB, and instructing the micro eNodeB to retransmit, by using the secondary cell, the RLC data packet corresponding to the NACK to the UE in the ARQ manner. After receiving the NACK and an instruction that are sent by the macro eNodeB, where the instruction is used to instruct the micro eNodeB to retransmit, by using the secondary cell, the RLC data packet corresponding to the NACK in the ARQ manner, the micro eNodeB retransmits, by using the secondary cell, the RLC data packet corresponding to the NACK to the UE in the ARQ manner.

For example, in a frequency division duplexing (FDD) system, a quantity of HARQ processes (ID) specified in the protocol is 8 (that is, a maximum quantity of available HARQ IDs on the air interface); however, because round-trip time (RTT) of an HARQ exists, RTT of an actual HARQ is 8+N (N refers to an inter-site unidirectional link delay); in an extreme scenario, a quantity of the available HARQ IDs may be insufficient. In the prior art, when all the eight HARQ IDs in the secondary cell have been used and no HARQ ID is released, in this case, if a new RLC data packet needs to be retransmitted by the micro eNodeB, retransmission is not performed temporarily, and the retransmission is performed when an idle HARQ ID exists. That is, because of insufficient HARQ IDs, an RLC data packet cannot be sent at some time, so that a throughput loss of the UE is caused, and generally, a negative gain of the throughput loss of the UE is $N/(8+N)*100\%$.

In addition, in the prior art, if all the eight HARQ IDs have been used and no HARQ ID is released, in this case, if a new RLC data packet needs to be transmitted, an HARQ multiplexing manner may further be used, that is, a used HARQ ID is occupied, and an RLC data packet of this HARQ ID is set to be a newly transmitted RLC data packet. In this case, when it is required to perform HARQ retransmission on an RLC data packet sent in the occupied HARQ ID last time, the RLC data packet can only be sent to the receive end as a newly transmitted RLC data packet, and the RLC data packet cannot be processed as a retransmitted RLC data packet anymore; therefore, the receive end cannot obtain the HARQ combination gain.

After the method in this embodiment of the present invention is used, a macro eNodeB first determines whether a quantity of HARQ IDs currently used by a micro eNodeB in a secondary cell is less than a maximum quantity of HARQ IDs (that is, the maximum quantity of HARQ processes), if the quantity of HARQ IDs currently used by the micro eNodeB in the secondary cell is less than the maximum quantity of HARQ IDs, it is determined that an idle HARQ ID for retransmitting an RLC data packet exists, and a to-be-retransmitted RLC data packet may be transmitted in time, that is, a receive end can obtain an HARQ combination gain. However, if the quantity of HARQ IDs currently used by the micro eNodeB in the secondary cell is not less than the maximum quantity of HARQ IDs, generally, that is, the quantity of HARQ IDs currently used by the micro eNodeB in the secondary cell is equal to the maximum quantity of HARQ IDs, it indicates that no idle HARQ ID may be used to retransmit a new RLC data packet, and the new RLC data packet may not be transmitted in time; in this embodiment of the present invention, an HARQ manner may be abandoned, and an ARQ manner may be used to retransmit the new RLC data packet, so that the RLC data packet can be retransmitted as soon as possible; therefore, a delay required for retransmitting a data packet is reduced, and efficiency of retransmitting the data packet is improved.

Figure 3:
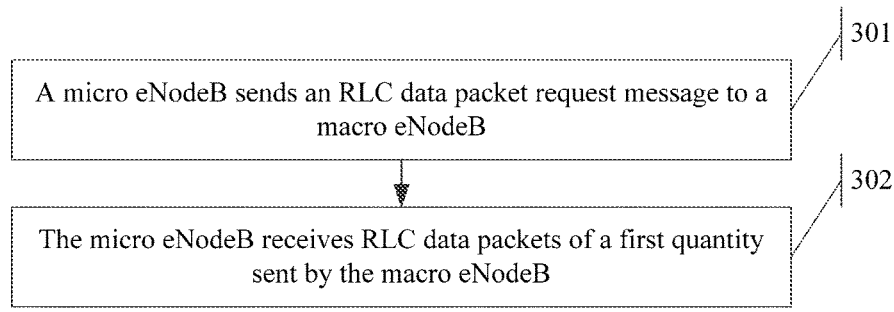
FIG. 3 is a main flowchart of an RLC data packet offloading method on a micro eNodeB side according to an embodiment of the present invention.

Referring to FIG. 3, based on a same inventive concept, an embodiment of the present invention provides another RLC data packet offloading method. A main procedure of the method is described as follows:

Step 301: A micro eNodeB sends an RLC data packet request message to a macro eNodeB.

The RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB.

Step 302: The micro eNodeB receives the RLC data packets of the first quantity sent by the macro eNodeB.

After receiving the RLC data packet request message, the macro eNodeB determines a second quantity of RLC data packets that are to be sent by the macro eNodeB to the CA UE by using a primary cell in duration of T−t, where a start time of the duration of T−t is a moment at which the macro eNodeB receives the RLC data packet request message.

A process of determining the RLC data packets of the first quantity includes: determining, by the macro eNodeB according to the RLC data packet request message, the second quantity of RLC data packets that are to be sent by the macro eNodeB to the UE by using the primary cell in the duration of T−t, where the start time of the duration of T−t is the moment at which the macro eNodeB receives the RLC data packet request message; allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

Optionally, in this embodiment of the present invention, after the micro eNodeB receives the RLC data packets of the first quantity sent by the macro eNodeB, the method further includes:

sending, by the micro eNodeB, the RLC data packets of the first quantity to the UE.

Optionally, in this embodiment of the present invention, after the sending, by the micro eNodeB, the RLC data packets of the first quantity to the UE, the method may further include:

receiving, by the micro eNodeB, feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

That is, the UE sends the feedback information for the RLC data packets of the first quantity to the macro eNodeB; after the macro eNodeB receives the feedback information for the RLC data packets of the first quantity, if the feedback information includes an ACK, the macro eNodeB directly sends the ACK in the feedback information to the micro eNodeB; and if the feedback information includes an NACK, the macro eNodeB determines whether an HARQ combination gain can be obtained by performing, by the micro eNodeB by using the secondary cell, an HARQ on an RLC data packet corresponding to the NACK, if the HARQ combination gain can be obtained, the macro eNodeB sends the NACK to the micro eNodeB, and instructs the micro eNodeB to perform the HARQ on the RLC data packet corresponding to the NACK; after receiving the NACK and an instruction of the macro eNodeB, the micro eNodeB retransmits, by using the secondary cell, the RLC data packet corresponding to the NACK to the UE in an HARQ manner. However, if the macro eNodeB determines that the HARQ combination gain cannot be obtained by performing, by the micro eNodeB by using the secondary cell, the HARQ on the RLC data packet corresponding to the NACK, the macro eNodeB has two processing manners. One processing manner is: the macro eNodeB still sends the NACK to the micro eNodeB, and instructs the micro eNodeB to perform an ARQ on the RLC data packet corresponding to the NACK; after receiving the NACK and an instruction of the macro eNodeB, the micro eNodeB retransmits, by using the secondary cell, the RLC data packet corresponding to the NACK to the UE in an ARQ manner. The other processing manner is: the macro eNodeB retransmits, by using the primary cell, the RLC data packet corresponding to the NACK to the UE in an ARQ manner by itself, and in this case, the macro eNodeB may not send the NACK to the micro eNodeB.

Optionally, in this embodiment of the present invention, before the receiving, by the micro eNodeB, feedback information that is sent by the macro eNodeB and that is of the UE for a part or all of the RLC data packets of the first quantity, the method further includes:

sending, by the micro eNodeB, an RLC packet assembly result to the macro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity.

If the macro eNodeB determines that the HARQ combination gain cannot be obtained by performing, by the micro eNodeB by using the secondary cell, the HARQ on the RLC data packet corresponding to the NACK, the macro eNodeB retransmits, by using the primary cell, the RLC data packet corresponding to the NACK to the UE in the ARQ manner by itself, because the macro eNodeB has obtained the RLC packet assembly result and knows which specific RLC data packets have been transmitted by the micro eNodeB to the UE, the macro eNodeB may directly transmit the RLC data packet corresponding to the NACK to the UE in the ARQ manner.

However, in the prior art, although a macro eNodeB needs to retransmit RLC data packets, the macro eNodeB needs to first wait for an SN status report fed back by UE; after the SN status report is received, the macro eNodeB knows exactly which RLC data packets have been transmitted by a micro eNodeB to the UE; then the macro eNodeB can retransmit a part or all of the RLC data packets. It can be seen that, compared with the prior art, the technical solution in this embodiment of the present invention reduces time of RLC service interaction and improves transmission efficiency.

Detailed implementation parts related to the embodiment shown in FIG. 3 that are not introduced in the embodiment shown in FIG. 3 are introduced in the embodiment shown in FIG. 2. Reference may be made to the embodiment shown in FIG. 2 for details, and details are not described herein again.

Figure 4A:
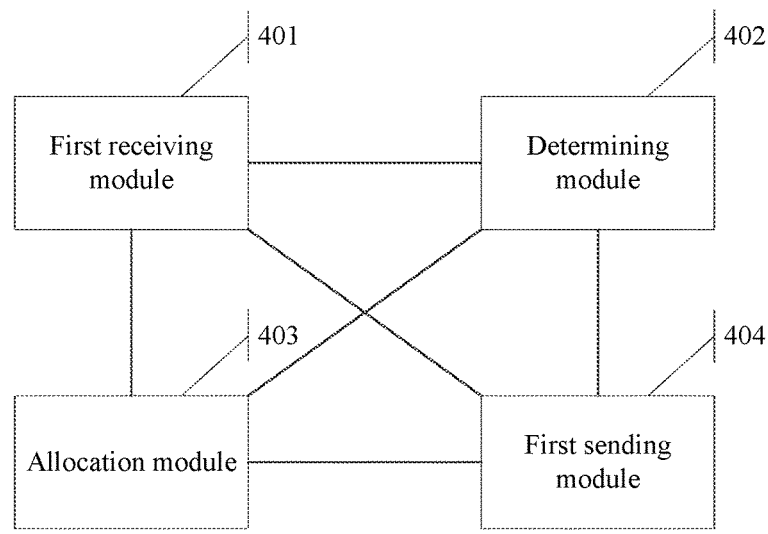
FIG. 4A is a main structural block diagram of a macro eNodeB according to an embodiment of the present invention.

Referring to FIG. 4A, based on a same inventive concept, an embodiment of the present invention provides a macro eNodeB, and the macro eNodeB may include a first receiving module 401, a determining module 402, an allocation module 403, and a first sending module 404.

The first receiving module 401 is configured to receive an RLC data packet request message sent by a micro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB.

The determining module 402 is configured to determine, according to the RLC data packet request message, a second quantity of RLC data packets that are to be sent by the macro eNodeB to the UE by using a primary cell.

After the first receiving module 401 receives the RLC data packet request message, the determining module 402 determines the second quantity of RLC data packets that are to be sent by the macro eNodeB to the CA UE by using the primary cell in duration of T−t, where a start time of the duration of T−t is a moment at which the macro eNodeB receives the RLC data packet request message.

The allocation module 403 is configured to allocate, in ascending order of serial numbers of to-be-sent RLC data packets, first RLC data packets of the second quantity in the to-be-sent RLC data packets to the macro eNodeB, and allocate, starting from a first RLC data packet whose serial number follows serial numbers of the first RLC data packets of the second quantity, the RLC data packets of the first quantity to the micro eNodeB.

The first sending module 404 is configured to send the RLC data packets of the first quantity to the micro eNodeB.

Figure 4B:
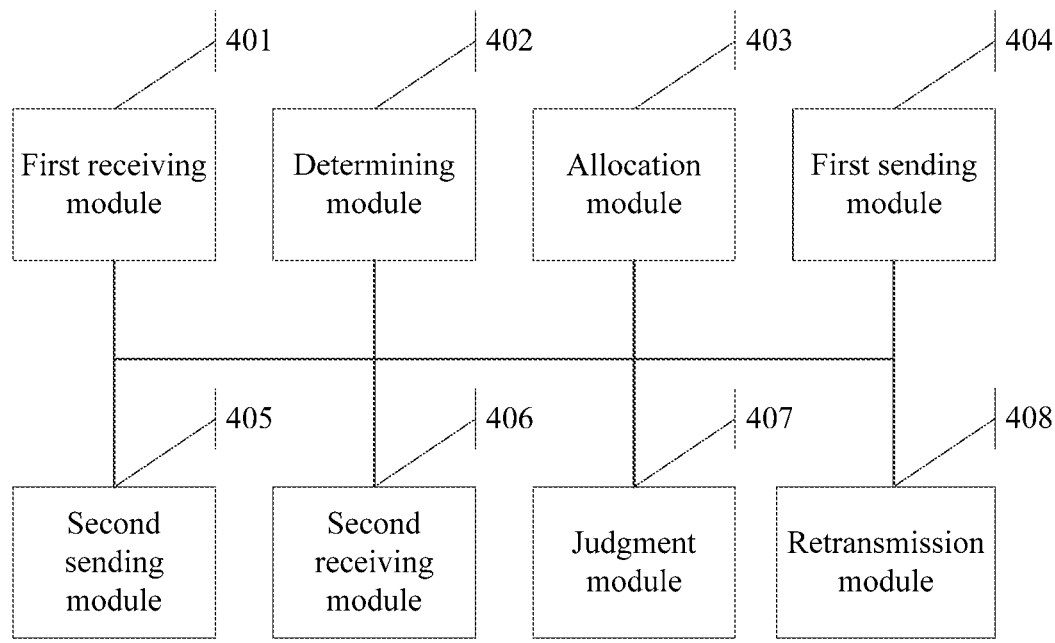
FIG. 4B is a detailed structural block diagram of a macro eNodeB according to an embodiment of the present invention.

Optionally, referring to FIG. 4B, in this embodiment of the present invention, the macro eNodeB further includes a second sending module 405, and the second sending module 405 is configured to:

send the RLC data packets of the second quantity to the UE by using the primary cell.

Optionally, still referring to FIG. 4B, in this embodiment of the present invention, the macro eNodeB further includes a second receiving module 406, and the second receiving module 406 is configured to:

receive, by using the primary cell, ACK/NACK information sent by the UE, where the ACK/NACK information includes feedback information of the UE for the RLC data packets of the first quantity and feedback information of the UE for the RLC data packets of the second quantity.

Optionally, still referring to FIG. 4B, in this embodiment of the present invention, the macro eNodeB further includes a judgment module 407, where the judgment module 407 is configured to: after the second receiving module 406 receives, by using the primary cell, the ACK/NACK information sent by the UE, if the feedback information that is in the ACK/NACK information and that is for the RLC data packets of the first quantity includes an NACK, determine whether an HARQ combination gain can be obtained by performing, by the micro eNodeB by using the secondary cell, an HARQ on an RLC data packet corresponding to the NACK.

The first sending module 404 is further configured to: if the HARQ combination gain can be obtained, send the NACK to the micro eNodeB, and instruct the micro eNodeB to retransmit the RLC data packet to the UE in an HARQ manner.

Optionally, in this embodiment of the present invention, the judgment module 407 is specifically configured to:

when it is determined that a quantity of HARQ processes currently used by the micro eNodeB in the secondary cell is less than a maximum quantity of HARQ processes, determine that the HARQ combination gain can be obtained by performing, by the micro eNodeB by using the secondary cell, the HARQ on the RLC data packet corresponding to the NACK.

Optionally, still referring to FIG. 4B, in this embodiment of the present invention, the macro eNodeB further includes a retransmission module 408, and the retransmission module 408 is configured to:

if the judgment module 407 determines that the HARQ combination gain cannot be obtained by performing, by the micro eNodeB by using the secondary cell, the HARQ on the RLC data packet corresponding to the NACK, retransmit, by using the primary cell and by using the second sending module 405, the RLC data packet corresponding to the NACK to the UE in an ARQ manner.

Optionally, in this embodiment of the present invention, the first receiving module 401 is further configured to:

before the second receiving module 406 receives, by using the primary cell, the ACK/NACK information sent by the UE, receive an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity.

The retransmission module 408 is specifically configured to retransmit, according to the RLC packet assembly result by using the primary cell and by using the second sending module 405, the RLC data packet corresponding to the NACK to the UE in the ARQ manner.

Optionally, in this embodiment of the present invention, the first sending module 404 is further configured to:

if the judgment module 407 determines that the HARQ combination gain cannot be obtained by performing, by the micro eNodeB by using the secondary cell, the HARQ on the RLC data packet corresponding to the NACK, send the NACK to the micro eNodeB, and instruct the micro eNodeB to retransmit, by using the secondary cell, the RLC data packet corresponding to the NACK to the UE in an ARQ manner.

Figure 5A:
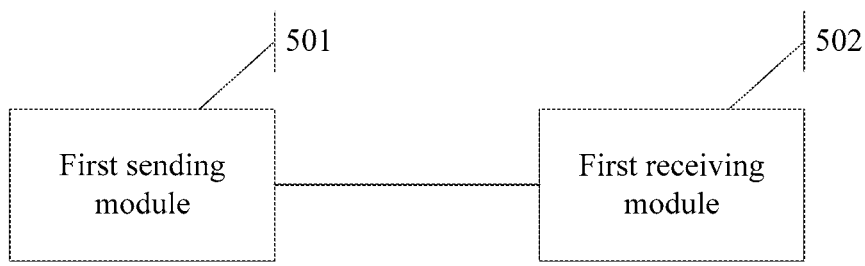
FIG. 5A is a main structural block diagram of a micro eNodeB according to an embodiment of the present invention.

Referring to FIG. 5A, based on a same inventive concept, an embodiment of the present invention provides a micro eNodeB, and the micro eNodeB may include a first sending module 501 and a first receiving module 502.

Figure 5B:
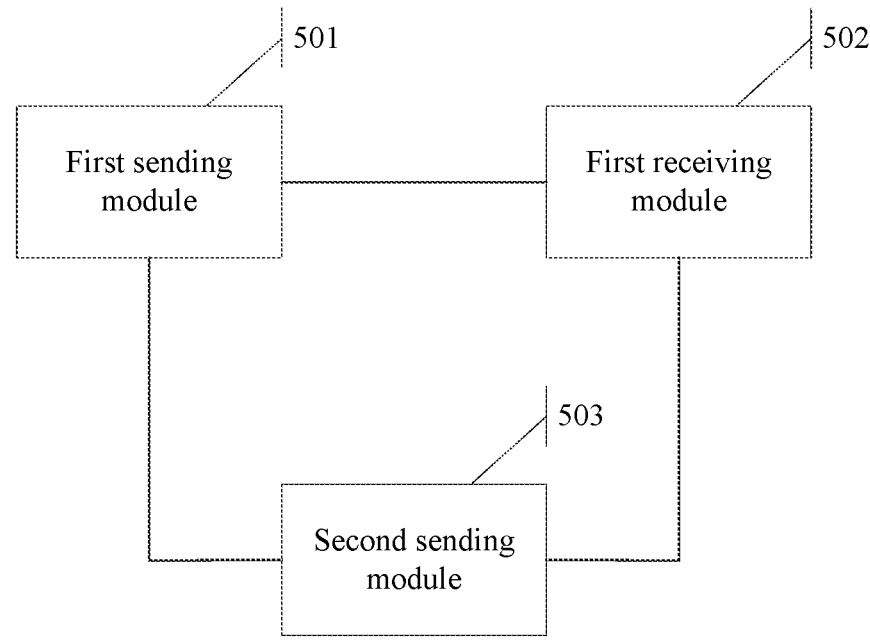
FIG. 5B is a detailed structural block diagram of a micro eNodeB according to an embodiment of the present invention.

The first sending module 501 is configured to send an RLC data packet request message to a macro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB by using the first sending module at a first moment; a time difference between the first moment and a second moment is T, and T is greater than or equal to 2t; the second moment is a moment at which the micro eNodeB sends RLC data packets of the first quantity to the UE by using a second sending module 503 (referring to FIG. 5B, the micro eNodeB further includes the second sending module 503); and t is a unidirectional transmission delay between the micro eNodeB and the macro eNodeB.

The first receiving module 502 is configured to receive the RLC data packets of the first quantity sent by the macro eNodeB, where a process of determining the RLC data packets of the first quantity includes: determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocating, by the macro eNodeB in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

Optionally, in this embodiment of the present invention, the first receiving module 502 is further configured to:

receive feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

Optionally, in this embodiment of the present invention, the first sending module 501 is further configured to:

before the first receiving module 502 receives the feedback information that is sent by the macro eNodeB and that is of the UE for a part or all of the RLC data packets of the first quantity, send an RLC packet assembly result to the macro eNodeB, where the RLC packet assembly result is used to indicate information about an RLC data packet that is transmitted by the micro eNodeB to the UE by using the secondary cell and by using the second sending module 503, and the RLC data packet that is transmitted by the micro eNodeB to the UE by using the secondary cell and by using the second sending module 503 comprises a part or all of the RLC data packets of the first quantity.

Optionally, in this embodiment of the present invention, the second sending module 503 is further configured to send the RLC data packets of the first quantity to the UE.

Optionally, in this embodiment of the present invention, the second sending module 503 is further configured to retransmit, according to an instruction of the macro eNodeB by using the secondary cell, an RLC data packet corresponding to an NACK to the UE in an HARQ or ARQ manner.

Figure 6A:
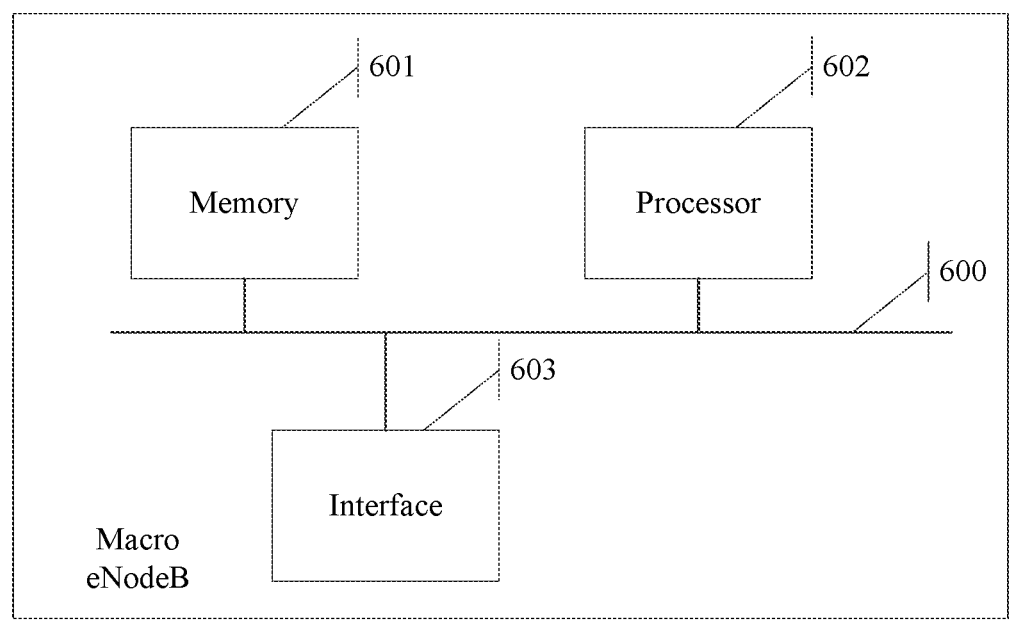
FIG. 6A is a main schematic structural diagram of a macro eNodeB according to an embodiment of the present invention.

Referring to FIG. 6A, based on a same inventive concept, an embodiment of the present invention provides a macro eNodeB, and the macro eNodeB may include a memory 601, a processor 602, and an interface 603 that are connected to a bus 600.

The memory 601 is configured to store an instruction required by the processor 602 to execute a task.

The interface 603 is configured to receive an RLC data packet request message sent by a micro eNodeB, where the RLC data packet request message is used by the micro eNodeB to request, from the macro eNodeB, a first quantity of RLC data packets that are to be sent by the micro eNodeB to CA UE by using a secondary cell; the RLC data packet request message is sent by the micro eNodeB to the macro eNodeB at a first moment; a time difference between the first moment and a second moment is T, and T is greater than or equal to 2t; the second moment is a moment at which the micro eNodeB sends RLC data packets of the first quantity to the UE; and t is a unidirectional transmission delay between the micro eNodeB and the macro eNodeB.

The processor 602 invokes the instruction stored in the memory 601 to determine, according to the RLC data packet request message, a second quantity of RLC data packets that are to be sent by the macro eNodeB to the UE by using a primary cell; and allocate, in ascending order of serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

Specifically, the processor 602 is configured to perform: after receiving the RLC data packet request message by using the interface 603, determining the second quantity of RLC data packets that are to be sent by the macro eNodeB to the CA UE by using the primary cell in duration of T−t, where a start time of the duration of T−t is a moment at which the RLC data packet request message is received.

The processor 602 is further configured to send the RLC data packets of the first quantity to the micro eNodeB by using the interface 603.

Figure 6B:
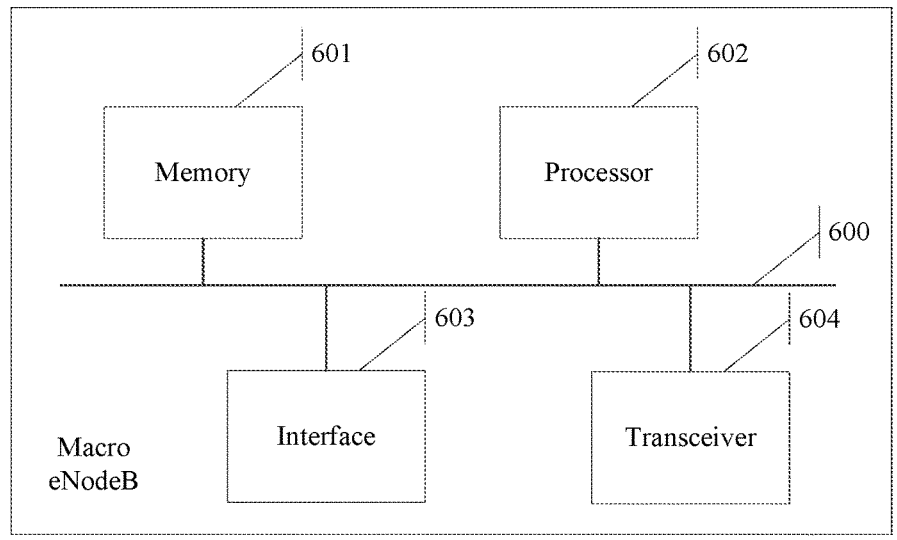
FIG. 6B is a detailed schematic structural diagram of a macro eNodeB according to an embodiment of the present invention.

Optionally, referring to FIG. 6B, in this embodiment of the present invention, the macro eNodeB further includes a transceiver 604 connected to the bus 600, and the processor 602 is further configured to send the RLC data packets of the second quantity to the UE by using the primary cell and by using the transceiver 604.

Optionally, in this embodiment of the present invention, the transceiver 604 is further configured to receive, by using the primary cell, ACK/NACK information sent by the UE, where the ACK/NACK information includes feedback information of the UE for the RLC data packets of the first quantity and feedback information of the UE for the RLC data packets of the second quantity.

Optionally, in this embodiment of the present invention, the processor 602 is further configured to:

after the transceiver 604 receives, by using the primary cell, the ACK/NACK information sent by the UE, if the feedback information that is in the ACK/NACK information and that is for the RLC data packets of the first quantity includes an NACK, determine whether an HARQ combination gain can be obtained by performing, by the micro eNodeB by using the secondary cell, an HARQ on an RLC data packet corresponding to the NACK; and if the HARQ combination gain can be obtained, send the NACK to the micro eNodeB by using the interface 603, and instruct the micro eNodeB to retransmit the RLC data packet to the UE in an HARQ manner.

Optionally, in this embodiment of the present invention, that the processor 602 is further configured to determine whether the HARQ combination gain can be obtained by performing, by the micro eNodeB by using the secondary cell, the HARQ on the RLC data packet corresponding to the NACK is specifically:

when it is determined that a quantity of HARQ processes currently used by the micro eNodeB in the secondary cell is less than a maximum quantity of HARQ processes, determining that the HARQ combination gain can be obtained by performing, by the micro eNodeB by using the secondary cell, the HARQ on the RLC data packet corresponding to the NACK.

Optionally, in this embodiment of the present invention, the processor 602 is further configured to:

if it is determined that the HARQ combination gain cannot be obtained by performing, by the micro eNodeB by using the secondary cell, the HARQ on the RLC data packet corresponding to the NACK, retransmit, by using the primary cell and by using the transceiver 604, the RLC data packet corresponding to the NACK to the UE in an ARQ manner.

Optionally, in this embodiment of the present invention, the interface 603 is further configured to: before the transceiver 604 receives, by using the primary cell, the ACK/NACK information sent by the UE, receive an RLC packet assembly result sent by the micro eNodeB, where the RLC packet assembly result is used to indicate information about an RLC data packet that is transmitted by the micro eNodeB to the UE by using the secondary cell, and the RLC data packet transmitted by the micro eNodeB to the UE by using the secondary cell comprises a part or all of the RLC data packets of the first quantity.

That the processor 602 is further configured to retransmit, by using the primary cell and by using the transceiver 604, the RLC data packet corresponding to the NACK to the UE in an ARQ manner is specifically: retransmitting, according to the RLC packet assembly result by using the primary cell and by using the transceiver 604, the RLC data packet corresponding to the NACK to the UE in the ARQ manner.

Optionally, in this embodiment of the present invention, the processor 602 is further configured to:

if it is determined that the HARQ combination gain cannot be obtained by performing, by the micro eNodeB by using the secondary cell, the HARQ on the RLC data packet corresponding to the NACK, send the NACK to the micro eNodeB by using the interface 603, and instruct the micro eNodeB to retransmit, by using the secondary cell, the RLC data packet corresponding to the NACK to the UE in an ARQ manner.

Figure 7:
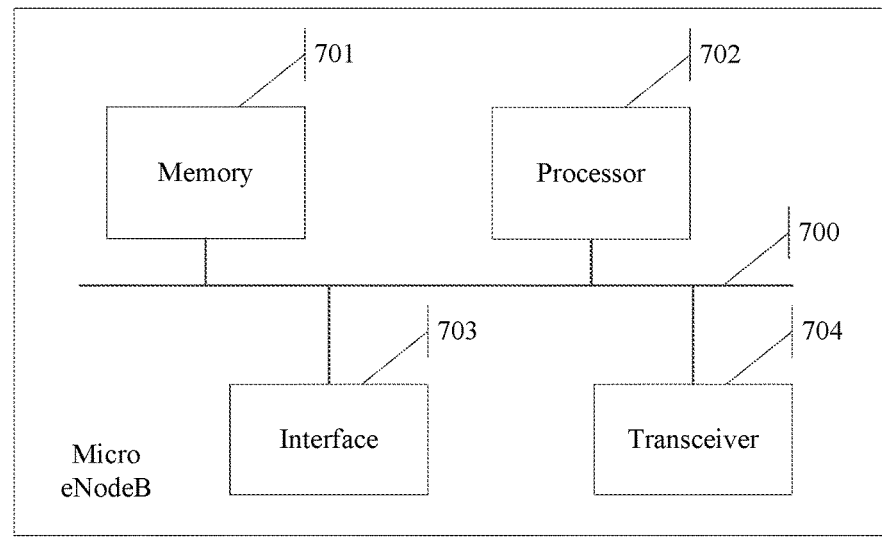
FIG. 7 is a schematic structural diagram of a micro eNodeB according to an embodiment of the present invention.

Referring to FIG. 7, based on a same inventive concept, an embodiment of the present invention provides a micro eNodeB, and the micro eNodeB may include a memory 701, a processor 702, an interface 703, and a transceiver 704 that are connected to a bus 700.

The memory 701 is configured to store an instruction required by the processor 702 to execute a task.

The processor 702 invokes the instruction stored in the memory 701 to send an RLC data packet request message to a macro eNodeB by using the interface 703, where: the RLC data packet request message is used by the micro eNodeB to request, from the macro eNodeB, a first quantity of RLC data packets that are to be sent by the micro eNodeB to CA UE by using a secondary cell; the RLC data packet request message is sent by the processor 702 to the macro eNodeB by using the interface 703 at a first moment; a time difference between the first moment and a second moment is T, and T is greater than or equal to 2t; the second moment is a moment at which the processor 702 sends RLC data packets of the first quantity to the UE by using the transceiver 704; and t is a unidirectional transmission delay between the micro eNodeB and the macro eNodeB.

The interface 703 is configured to receive the RLC data packets of the first quantity sent by the macro eNodeB, where a process of determining the RLC data packets of the first quantity includes: determining, by the macro eNodeB according to the RLC data packet request message, a second quantity of RLC data packets that are to be sent by the macro eNodeB to the UE by using a primary cell in duration of T−t, where a start time of the duration of T−t is a moment at which the macro eNodeB receives the RLC data packet request message; and allocating, by the macro eNodeB in ascending order serial numbers of to-be-sent RLC data packets, first RLC data packets of the second quantity in the to-be-sent RLC data packets to the macro eNodeB, and allocating, starting from a first RLC data packet whose serial number follows serial numbers of the first RLC data packets of the second quantity, the RLC data packets of the first quantity to the micro eNodeB.

Optionally, in this embodiment of the present invention, the interface 703 is further configured to receive feedback information that is sent by the macro eNodeB and that is of the UE for a part or all of the RLC data packets of the first quantity, where the feedback information of the UE for the RLC data packets of the first quantity belongs to ACK/NACK information sent by the UE to the macro eNodeB, and the ACK/NACK information further includes feedback information of the UE for the RLC data packets of the second quantity.

Optionally, in this embodiment of the present invention, the processor 702 is further configured to:

before the interface 703 receives the feedback information that is sent by the macro eNodeB and that is of the UE for a part or all of the RLC data packets of the first quantity, send an RLC packet assembly result to the macro eNodeB by using the interface 703, where the RLC packet assembly result is used to indicate information about an RLC data packet that is transmitted by the processor 702 to the UE by using the secondary cell and by using the transceiver 704, and the RLC data packet that is transmitted by the processor 702 to the UE by using the secondary cell and by using the transceiver 704 comprises a part or all of the RLC data packets of the first quantity.

Optionally, in this embodiment of the present invention, the processor 702 is further configured to send the RLC data packets of the first quantity to the UE by using the transceiver 704.

Optionally, in this embodiment of the present invention, the processor 702 is further configured to retransmit, according to an instruction of the macro eNodeB by using the secondary cell and by using the transceiver 704, an RLC data packet corresponding to an NACK to the UE in an HARQ or ARQ manner.

In this embodiment of the present invention, a micro eNodeB may request a required RLC data packet at the first moment before a moment at which the RLC data packet is sent to UE; in this way, a macro eNodeB can send, to the micro eNodeB in advance, the RLC data packet required by the micro eNodeB; therefore a transmission delay between the macro eNodeB and the micro eNodeB is reduced as much as possible, and receiving performance of UE in a CA scenario of a non-ideal backhaul HetNet is improved.

In addition, in this embodiment of the present invention, a macro eNodeB uses duration of t to receive an RLC data packet request message of a micro eNodeB, determines RLC data packets of the second quantity that can be sent by the macro eNodeB in duration from a current moment to the second moment, allocates, to the macro eNodeB, first RLC data packets of the second quantity whose serial numbers come first, and allocates, to the micro eNodeB, RLC data packets of a first quantity whose serial numbers follow the serial numbers of the RLC data packets of the second quantity; and then the macro eNodeB starts to send the RLC data packets of the second quantity to UE. Because duration required by the macro eNodeB to send the RLC data packets of the second quantity is the duration from the current moment to the second moment, when the macro eNodeB completes sending of the data packets of the second quantity, the micro eNodeB exactly receives and starts to send the RLC data packets of the first quantity, and serial numbers of these RLC data packets are in sequential order, which ensures that the RLC data packets are sent in sequence, avoids that the UE is incapable of decoding the RLC data packets due to receiving of out-of-order RLC data packets, and further improves receiving performance of the UE.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein again.

The technical solutions in the embodiments of the present invention are also applicable to a networking scenario between first base stations and a networking scenario between second base stations, that is, a form of a base station is not limited in the embodiments of the present invention.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A radio link control (RLC) data packet offloading method, comprising:

receiving, by a first base station, an RLC data packet request message sent by a second base station, wherein: the RLC data packet request message is used by the second base station to request, from the first base station, a first quantity of RLC data packets that are to be sent by the second base station to a carrier aggregation (CA) user equipment (UE) using a secondary cell; the RLC data packet request message is sent by the second base station to the first base station at a first moment; a time difference between the first moment and a second moment is T, and T is greater than or equal to 2t; the second moment is a moment at which the second base station sends RLC data packets of the first quantity to the CA UE; and t is a unidirectional transmission delay between the second base station and the first base station;

determining, by the first base station according to the RLC data packet request message, a second quantity of RLC data packets that are to be sent by the first base station to the CA UE using a primary cell in duration of T−t, wherein a start time of the duration of T−t is a moment at which the first base station receives the RLC data packet request message;

allocating, by the first base station in an ascending order of serial numbers of to-be-sent RLC data packets, first RLC data packets of the second quantity in the to-be-sent RLC data packets to the first base station, and allocating, starting from a first RLC data packet whose serial number follows serial numbers of the first RLC data packets of the second quantity, the RLC data packets of the first quantity to the second base station; and sending, by the first base station, the RLC data packets of the first quantity to the second base station.

2. The RLC data packet offloading method according to claim 1, wherein the method further comprises:

sending, by the first base station, the RLC data packets of the second quantity to the CA UE using the primary cell.

3. The RLC data packet offloading method according to claim 2, wherein the method further comprises:
receiving, by the first base station using the primary cell, acknowledgement (ACK)/negative acknowledgement (NACK) information sent by the CA UE, wherein the ACK/NACK information comprises feedback information of the CA UE for the RLC data packets of the first quantity and feedback information of the CA UE for the RLC data packets of the second quantity.

4. The RLC data packet offloading method according to claim 3, wherein after the receiving, by the first base station using the primary cell, ACK/NACK information sent by the CA UE, the method further comprises:
when the feedback information that is for the RLC data packets of the first quantity and that is received by the first base station comprises an NACK, determining, by the first base station, whether an hybrid automatic repeat request (HARQ) combination gain can be obtained by performing, by the second base station using the secondary cell, an HARQ on an RLC data packet corresponding to the NACK; and
when the HARQ combination gain can be obtained, sending, by the first base station, the NACK to the second base station, and instructing the second base station to retransmit the RLC data packet to the CA UE in an HARQ manner.

5. The RLC data packet offloading method according to claim 4, wherein the determining, by the first base station, whether an HARQ combination gain can be obtained by performing, by the second base station using the secondary cell, a HARQ on an RLC data packet corresponding to the NACK comprises:
when the first base station determines that a quantity of HARQ processes currently used by the second base station in the secondary cell is less than a maximum quantity of HARQ processes, determining, by the first base station, that the HARQ combination gain can be obtained by performing, by the second base station using the secondary cell, the HARQ on the RLC data packet corresponding to the NACK.

6. The RLC data packet offloading method according to claim 5, wherein the method further comprises:
when the first base station determines that the HARQ combination gain cannot be obtained by performing, by the second base station by using the secondary cell, the HARQ on the RLC data packet corresponding to the NACK, retransmitting, by the first base station using the primary cell, the RLC data packet corresponding to the NACK to the CA UE in an automatic repeat request (ARQ) manner.

7. The RLC data packet offloading method according to claim 6, wherein before the receiving, by the first base station using the primary cell, ACK/NACK information sent by the CA UE, the method further comprises:
receiving, by the first base station, an RLC packet assembly result sent by the second base station, wherein the RLC packet assembly result is used to indicate information about an RLC data packet that is transmitted by the second base station to the CA UE using the secondary cell, and the RLC data packet transmitted by the second base station to the CA UE using the secondary cell comprises a part or all of the RLC data packets of the first quantity; and the retransmitting, by the first base station using the primary cell, the RLC data packet corresponding to the NACK to the CA UE in an ARQ manner comprises:
retransmitting, by the first base station according to the RLC packet assembly result using the primary cell, the RLC data packet corresponding to the NACK to the CA UE in the ARQ manner.

8. The RLC data packet offloading method according to claim 5, wherein the method further comprises:
when the first base station determines that the HARQ combination gain cannot be obtained by performing, by the second base station using the secondary cell, the HARQ on the RLC data packet corresponding to the NACK, sending, by the first base station, the NACK to the second base station, and instructing the second base station to retransmit, using the secondary cell, the RLC data packet corresponding to the NACK to the CA UE in an ARQ manner.

9. A radio link control (RLC) data packet offloading method, comprising:
sending, by a second base station, an RLC data packet request message to a first base station, wherein: the RLC data packet request message is used by the second base station to request, from the first base station, a first quantity of RLC data packets that are to be sent by the second base station to a carrier aggregation (CA) user equipment (UE) using a secondary cell; the RLC data packet request message is sent by the second base station to the first base station at a first moment; a time difference between the first moment and a second moment is T, and T is greater than or equal to 2t; the second moment is a moment at which the second base station sends RLC data packets of the first quantity to the CA UE; and t is a unidirectional transmission delay between the second base station and the first base station; and
receiving, by the second base station, the RLC data packets of the first quantity sent by the first base station, wherein a process of determining the RLC data packets of the first quantity comprises: determining, by the first base station according to the RLC data packet request message, a second quantity of RLC data packets that are to be sent by the first base station to the CA UE using a primary cell in duration of T−t, wherein a start time of the duration of T−t is a moment at which the first base station receives the RLC data packet request message; and allocating, by the first base station in an ascending order of serial numbers of to-be-sent RLC data packets, first RLC data packets of the second quantity in the to-be-sent RLC data packets to the first base station, and allocating, starting from a first RLC data packet whose serial number follows serial numbers of the first RLC data packets of the second quantity, the RLC data packets of the first quantity to the second base station.

10. The RLC data packet offloading method according to claim 9, wherein the method further comprises:
receiving, by the second base station, feedback information that is sent by the first base station and that is of the CA UE for a part or all of the RLC data packets of the first quantity, wherein the feedback information of the CA UE for the RLC data packets of the first quantity belongs to acknowledgement (ACK)/negative acknowledgement (NACK) information sent by the CA UE to the first base station, and the ACK/NACK information further comprises feedback information of the CA UE for the RLC data packets of the second quantity.

11. The RLC data packet offloading method according to claim 10, wherein before the receiving, by the second base station, feedback information that is sent by the first base station and that is of the CA UE for a part or all of the RLC data packets of the first quantity, the method further comprises:

sending, by the second base station, an RLC packet assembly result to the first base station, wherein the RLC packet assembly result is used to indicate information about an RLC data packet that is transmitted by the second base station to the CA UE using the secondary cell, and the RLC data packet transmitted by the second base station to the CA UE using the secondary cell comprises a part or all of the RLC data packets of the first quantity.

12. A base station, configured to serve as a first base station and comprising a memory, a processor, and an interface, wherein:

the memory is configured to store an instruction;

the interface is configured to receive a radio link control (RLC) data packet request message sent by a second base station, wherein: the RLC data packet request message is used by the second base station to request, from the first base station, a first quantity of RLC data packets that are to be sent by the second base station to a carrier aggregation (CA) user equipment (UE) using a secondary cell; the RLC data packet request message is sent by the second base station to the first base station at a first moment; a time difference between the first moment and a second moment is T, and T is greater than or equal to 2t; the second moment is a moment at which the second base station sends RLC data packets of the first quantity to the CA UE; and t is a unidirectional transmission delay between the second base station and the first base station;

the processor is configured to invoke the instruction of the memory to determine, according to the RLC data packet request message, a second quantity of RLC data packets that are to be sent by the first base station to the CA UE by using a primary cell in duration of T−t, wherein a start time of the duration of T−t is a moment at which the first base station receives the RLC data packet request message; and allocate, in an ascending order of serial numbers of to-be-sent RLC data packets, first RLC data packets of the second quantity in the to-be-sent RLC data packets to the first base station, and allocating, starting from a first RLC data packet whose serial number follows serial numbers of the first RLC data packets of the second quantity, the RLC data packets of the first quantity to the second base station; and the processor is further configured to send the RLC data packets of the first quantity to the second base station using the interface.

13. The base station according to claim 12, wherein the base station further comprises a transceiver; and the processor is further configured to:

send the RLC data packets of the second quantity to the CA UE using the primary cell and using the transceiver.

14. The base station according to claim 13, wherein the transceiver is configured to:

receive, using the primary cell, acknowledgement (ACK)/ negative acknowledgement (NACK) information sent by the CA UE, wherein the ACK/NACK information comprises feedback information of the CA UE for the RLC data packets of the first quantity and feedback information of the CA UE for the RLC data packets of the second quantity.

15. The base station according to claim 14, wherein the processor is further configured to:

after the transceiver receives, using the primary cell, the ACK/NACK information sent by the CA UE, when the feedback information that is in the ACK/NACK information and that is for the RLC data packets of the first quantity comprises an NACK, determine whether a hybrid automatic repeat request (HARQ) combination gain can be obtained by performing, by the second base station using the secondary cell, an HARQ on an RLC data packet corresponding to the NACK; and when the HARQ combination gain can be obtained, send the NACK to the second base station using the interface and instruct the second base station to retransmit the RLC data packet to the CA UE in an HARQ manner.

16. The base station according to claim 15, wherein that the processor is further configured to determine whether an HARQ combination gain can be obtained by performing, by the second base station using the secondary cell, an HARQ on an RLC data packet corresponding to the NACK is:

when it is determined that a quantity of HARQ processes currently used by the second base station in the secondary cell is less than a maximum quantity of HARQ processes, determining that the HARQ combination gain can be obtained by performing, by the second base station using the secondary cell, the HARQ on the RLC data packet corresponding to the NACK.

17. The base station according to claim 16, wherein the processor is further configured to:

when it is determined that the HARQ combination gain cannot be obtained by performing, by the second base station using the secondary cell, the HARQ on the RLC data packet corresponding to the NACK, retransmit, using the primary cell and using the transceiver, the RLC data packet corresponding to the NACK to the CA UE in an automatic repeat request (ARQ) manner.

18. The base station according to claim 17, wherein the interface is further configured to: before the transceiver receives, using the primary cell, the ACK/NACK information sent by the CA UE, receive an RLC packet assembly result sent by the second base station, wherein: the RLC packet assembly result is used to indicate information about an RLC data packet that is transmitted by the second base station to the CA UE using the secondary cell, and the RLC data packet transmitted by the second base station to the CA UE using the secondary cell comprises a part or all of the RLC data packets of the first quantity; and that the processor is further configured to retransmit, using the primary cell and using the transceiver, the RLC data packet corresponding to the NACK to the CA UE in an ARQ manner is: retransmitting, according to the RLC packet assembly result using the primary cell and using the transceiver, the RLC data packet corresponding to the NACK to the CA UE in the ARQ manner.

19. The base station according to claim 16, wherein the processor is further configured to:

when it is determined that the HARQ combination gain cannot be obtained by performing, by the second base station using the secondary cell, the HARQ on the RLC data packet corresponding to the NACK, send the NACK to the second base station using the interface, and instruct the second base station to retransmit, using the secondary cell, the RLC data packet corresponding to the NACK to the CA UE in an ARQ manner.

* * * * *